US011457288B1

(12) United States Patent
Gupta et al.

(10) Patent No.: US 11,457,288 B1
(45) Date of Patent: Sep. 27, 2022

(54) REWIND AND FAST FORWARD OF CONTENT

(71) Applicant: Rovi Guides, Inc., San Jose, CA (US)

(72) Inventors: Vikram Makam Gupta, Karnataka (IN); Vishwas Sharadanagar Panchaksharaiah, Karnataka (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/377,221

(22) Filed: Jul. 15, 2021

(51) Int. Cl.
| H04N 21/2387 | (2011.01) |
| H04N 21/6587 | (2011.01) |
| H04N 21/466 | (2011.01) |
| H04N 21/472 | (2011.01) |
| H04N 21/442 | (2011.01) |

(52) U.S. Cl.
CPC ..... *H04N 21/6587* (2013.01); *H04N 21/2387* (2013.01); *H04N 21/44204* (2013.01); *H04N 21/4662* (2013.01); *H04N 21/47217* (2013.01)

(58) Field of Classification Search
CPC .......... H04N 21/6587; H04N 21/2387; H04N 21/44204; H04N 21/4662; H04N 21/47217
See application file for complete search history.

(56) References Cited

U.S. PATENT DOCUMENTS

| 8,843,951 | B1* | 9/2014 | Sherrets | H04N 21/8456 |
| | | | | 725/38 |
| 9,661,384 | B1* | 5/2017 | Franzini | G11B 27/105 |
| 11,252,450 | B2* | 2/2022 | Smith | H04N 21/812 |
| 2010/0077435 | A1* | 3/2010 | Kandekar | H04N 9/8233 |
| | | | | 725/61 |
| 2011/0080940 | A1* | 4/2011 | Bocharov | H04L 67/561 |
| | | | | 375/240.01 |
| 2012/0197419 | A1* | 8/2012 | Dhruv | H04N 21/26258 |
| | | | | 700/94 |
| 2014/0181667 | A1* | 6/2014 | Chen | H04N 21/84 |
| | | | | 715/716 |
| 2015/0365730 | A1* | 12/2015 | Mohan | G11B 27/322 |
| | | | | 725/21 |
| 2017/0332120 | A1* | 11/2017 | Maynard | H04N 21/4882 |
| 2017/0366859 | A1* | 12/2017 | Chimayan | H04N 21/47217 |
| 2018/0191796 | A1* | 7/2018 | Gandhi | H04N 21/251 |
| 2019/0208282 | A1* | 7/2019 | Singh | H04N 5/783 |
| 2019/0259424 | A1* | 8/2019 | Lintz | G11B 27/005 |
| 2019/0261056 | A1* | 8/2019 | Meyer | H04N 21/4532 |
| 2020/0097731 | A1* | 3/2020 | Gupta | G06V 20/41 |
| 2020/0137450 | A1* | 4/2020 | Mishra | H04N 21/47217 |
| 2020/0275161 | A1* | 8/2020 | Yan | H04N 21/47217 |
| 2021/0392407 | A1* | 12/2021 | Aher | H04N 21/4532 |

* cited by examiner

*Primary Examiner* — John R Schnurr
(74) *Attorney, Agent, or Firm* — Haley Guiliano LLP

(57) ABSTRACT

Systems and methods for providing fast forwarding recommendations based on the user's consumption history are disclosed. The consumption history includes data relating to attributes that were previously rewinded and watched and those that were skipped and forwarded. It also includes scores for attributes that were present and absent in a portion that was previously rewinded or forwarded. A score is assigned to the attributes and used for determining a consumption pattern. If the consumption pattern indicates that the user previously rewinded and watched the attribute, then a recommendation not to skip an upcoming portion that includes the attribute is provided. A graphical timeline that depicts the amount of time saved by skipping the portion of the media asset with the attribute is also provided.

20 Claims, 17 Drawing Sheets

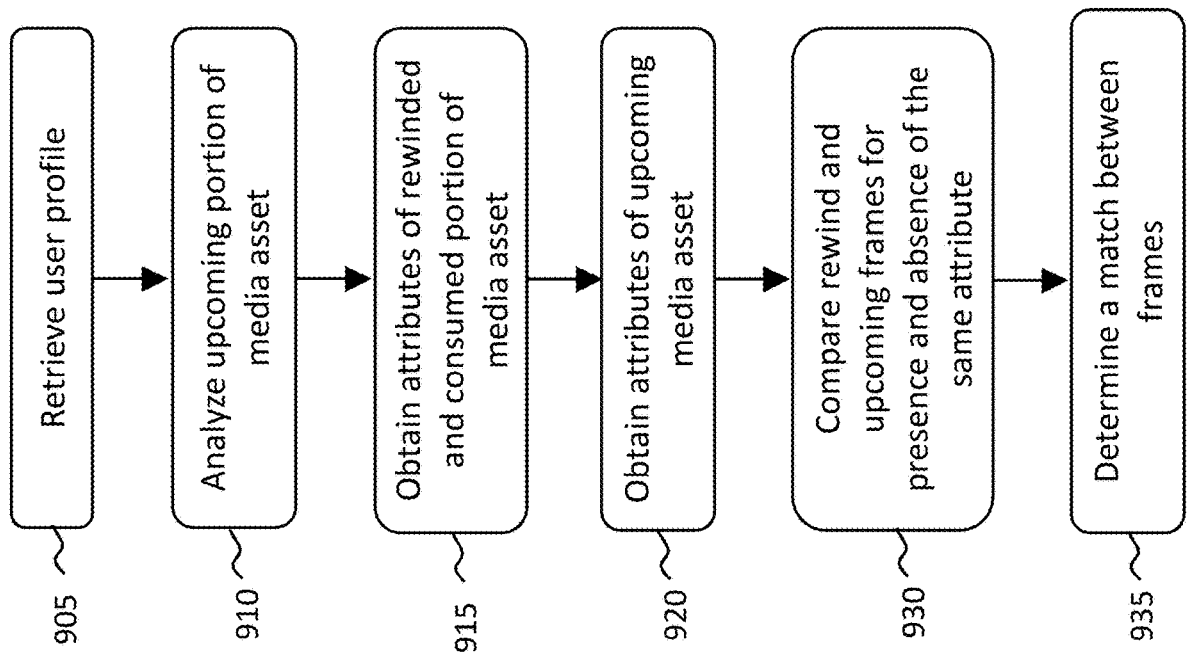

REWIND AND FAST FORWARD OF CONTENT

FIELD OF INVENTION

Embodiments of the present disclosure relate to fast forwarding content in a media asset based on the user's profile and/or consumption history relating to prior rewinds and fast forwards. The embodiments also generate a machine learning model and utilize the model to fast forward content that may not be of interest to the user as determined by the user's profile and/or consumption history.

BACKGROUND

Consumption of media assets has been on the rise over the recent years. Access to a library of numerous media assets provided by services such as Netflix™, Hulu™, Disney™, and HBOGO™ through various media and mobile devices has made it easy to find and consume a media asset at any time. (Netflix is a trademark owned by Netflix, Inc, Hulu is a trademark owned by Hulu. LLC, Disney is a trademark owned by Disney Enterprises, Inc, and HBOGO is a trademark owned by Home Box Office, Inc.). At the same time, individuals lead busy lives and have limited time to consume a media asset in its entirety. As such, it has become a common practice to fast forward portions of the media asset during its display.

There may be several reasons for fast forwarding and watching the media asset. For example, viewers may fast forward to save time and watch the media asset in a shorter amount of time. Viewers may also fast forward portions of the media asset that are not interesting to them. For example, viewers that are not interested in fighting scenes, nudity, songs, politics may choose to forward the portions of the media asset that contain such segments.

On the flip side, there may be some portions of the media asset that are interesting to the viewer. For example, a viewer may like dialog, action, car chases, romantic scenes, a specific character, or a location/setting of a particular scene, and, as such may rewind and rewatch such segments of the media asset one or more times.

Although fast forwarding and rewinding is a common practice, a problem with current methods is that they require the viewer to perform manual operations in order to fast forward or rewind a portion of the media asset. For example, when using a remote, the viewer may need to pick up their remote device and press a fast-forward or rewind button, and when watching the media asset on their touch screen device, the viewer may need to manually scroll across a timeline or drag and move the play position of the display to a fast forwarded or a rewinded play position.

In addition to the fast forward and rewind requiring manual operations to be performed by the viewer, yet another problem with current methods is that even when the media assets are manually fast forwarded or rewinded by the user on their remote device or touch screen, the viewer is unaware of the length of display that needs to be fast forwarded in order to skip a portion of the media asset that is not of interest or is unaware of the length of display that needs to be rewinded to ensure that the rewind places the display at a play position that is of interest. As such, the viewer either fast forwards too little or too much or rewinds too little or too much and ends ups maneuvering back-and-forth to determine their desired play position in the media asset from which the display is to be continued.

This is especially the case when the viewer is watching a portion of the media asset for the first time and does not know the exact length to fast forward or the exact frame at which the undesired scene will end. For example, a viewer not wanting to watch a car chase may fast forward too little resulting in the car chase still being displayed or fast forward too much and miss out on some essential portions of the plot that follows the car chase.

Yet another problem with the current methods is that a viewer may perceive that the upcoming segment is not of interest and fast forward the segment when in fact the segment relates to an area of interest that the user would have desired to watch. For example, a viewer that is interested in Tom Cruise may end up forwarding a segment that may depict an initial scene that is disliked by the viewer without knowing that segment also includes dialog from Tom Cruise at some play position after the initial scene.

As such, there is a need for systems and methods that provides intelligent fast forwarding capability that overcomes the above mentioned deficiencies in the current methods.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 9 is flowchart of a process for matching attributes in a fast forward portion with attributes in a rewind portion or attribute table of the rewind portion, in accordance with some embodiments of the disclosure;

DETAILED DESCRIPTION

Figure 1:
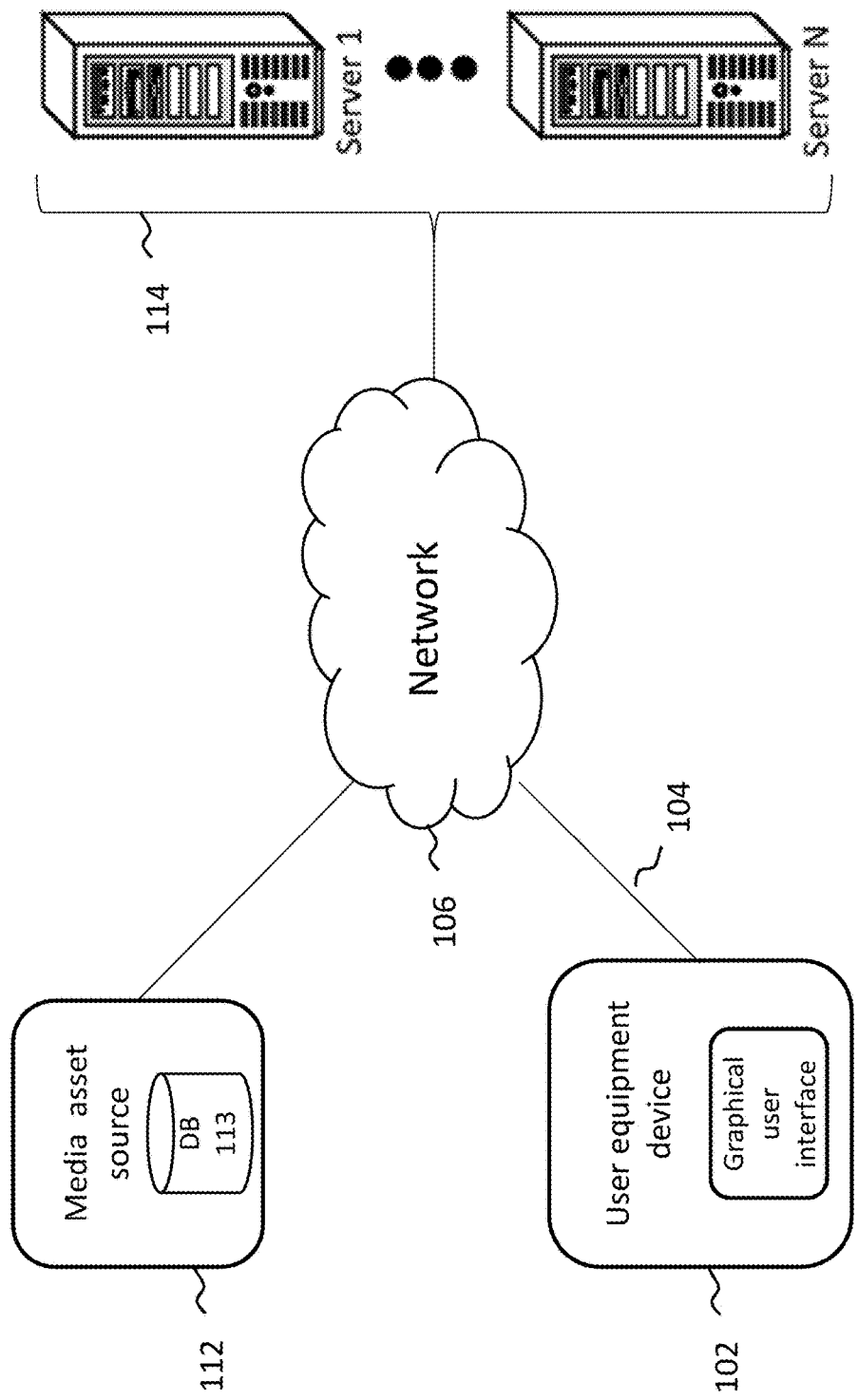
FIG. 1 is a block diagram of an exemplary system for recommending and managing fast forwarding and rewinding of a media asset, in accordance with some embodiments of the disclosure.

In accordance with some embodiments disclosed herein, the above-mentioned limitations are overcome by determining a characteristic/attribute of interest in a media asset based on the viewer's rewind pattern and recommending not to skip or fast forward an upcoming segment if the upcoming segment contains the characteristic of interest. The words characteristic and attribute are used interchangeably herein. The above-mentioned limitations are overcome by determining if an upcoming segment in a media asset includes an attribute that is not of interest or disliked by the viewer, and if so, automatically fast forwarding, or recommending the fast forward, of the upcoming segment to a play position in the media asset that skips the scenes related to the disliked factor while preventing or minimizing skipping other portions of the media asset after the scenes relating to the disliked factor.

In some embodiments, the systems and methods described herein are used to provide an intelligent auto forwarding mechanism to a viewer consuming a media asset. The method comprises receiving a plurality of rewind commands for a media asset displayed on a media device. Each rewind command, from the plurality of rewind commands, is associated with rewinding a separate segment of the media asset. The rewind command may also be related to rewinding a segment is separate media assets.

When a rewind is detected, the system extracts metadata for the portion of the segment that is rewinded. The extracted metadata is analyzed to determine one or more characteristics of the portion of the media asset that was rewinded. For example, the system may identify an actor, Tom cruise, as a characteristic. Some examples of other characteristics that may be identified include genre, characters, location, ambiance, action, dialog, politics, violence, foul language, comedy, horror, and nudity.

The system may collect rewind such characteristic data from each rewind and populate a table to determine if a pattern exists. For example, if a user rewinds a first segment in a media asset that contains Tom Cruise and then the user rewinds a second subsequent segment in the media asset that also contains Tom Cruise, then the system may populate the table and list two occurrences of Tom Cruise that were rewinded. Similarly, if the user rewinded a segment from a separate media asset that also contained Tom Cruise, then the system would add the rewind as yet another rewind occurrence in which Tom Cruise was displayed. The table may be indexed to a counter that is incremented each time a rewind of Tom Cruise is detected and based on the above mentioned example, the counter would indicated "3" occurrences of Tom Cruise.

When the number of occurrences of a characteristic in the table reaches a threshold value, the system may conclude that the characteristic is part of a pattern. The higher the number in the table, the higher the confidence level that a pattern exists. The pattern may indicate that the user likely is interested in Tom Cruise and as such would be likely interested in watching subsequent segments in the same media asset or segments in another media asset that contain Tom Cruise.

In some embodiments, a trickplay mode is used. In this embodiment, metadata associated with the rewinded portion, fast forwarded portion, or user profile may be stored in a database that can be accessed by a trickplay algorithm. The user may be provided an option to activate a trickplay mode, which can be activated at any point during or at the beginning of the display of the media asset, and when activated, the trickplay mode executes the trickplay algorithm that generates for display functions such as, rewind, pause, resume, or fast-forward of portions of media content.

In some embodiments, the system detects a fast forward command during the display of the media asset. In response to receiving the fast forward command, the system determines whether a segment in the media asst that will be skipped if the fast forwarding command is executed contains a characteristic from the rewind pattern. If a determination is made that the segment that will be skipped does contain the pattern characteristic, then the system may recommend not to skip the upcoming segment and provide a reason as to why such a recommendation was made.

For example, if a fast forward command is received to skip a segment of the media asset that contains Tom Cruise, since the system has determined based on the rewind pattern that the user is interested in Tom Cruise, the system may prevent the fast forwarding and provide for display a reason that the segment identified to be skipped contain Tom Cruise. In another embodiment, the system may pause or delete the execution of the fast forward and resume fast forwarding only if the user decides to override the recommendation and forward the segment anyway.

In some embodiments, instead of recommending not to fast forward the upcoming segment, the system may recommend the fast forwarding of an upcoming segment, or automatically fast forward the upcoming segment without input from the user, when the system determines that the upcoming segment contains a factor that is disliked by the user.

In this embodiment, the similar to detecting a pattern based on rewinds, the system may determine a pattern based on fast forwarding actions performed by the user in the same or separate media asset. The system may then extract metadata from the portion of the media asset that was fast forwarded, analyze the segment to extract one or more factors, and populate the pattern table with a count on the number of fast forwards executed by the user for each extracted factor. For example, if a user has fast forwarded a gun fight in either the same media asset or separate media assets, then the pattern table would list four occurrences of gun fights as fast forwarded. When the number of occurrences of the factor in the table reaches a threshold value, the system may conclude that the characteristic is part of a fast forwarding pattern. The pattern may indicate that the user dislikes the factor, such as gun fights, and an upcoming segment that contains a gun fight would either be fast forwarded automatically or a recommended to fast forward may be made such that the user may decide whether or not to fast forward.

In some embodiments, the system may keep a count of fast forwards and rewinds for the same characteristic and determine an aggregated count. Since rewinding is a positive indication of the user likely interested in the content and desiring to rewind and watch is again, the system may associate each rewind with a positive number. On the flip side, since forwarding is a negative indication of the user likely not interested in the content and desiring to skip the content, the system may associate each forward with a negative number. The counter indexed into the table may provide an aggregated count of all the rewinds and forward for each characteristic. For example, if a user rewinded a segment of a media asset that contains gun fights "seven times" and forwarded a segment that contains a gun fight "three times" the score would be "+4," i.e., +7 rewinds and −3 forwards, which equals to +4 rewinds.

In some embodiments the fast forwarding adapts, also referred to as adaptive fast forwarding, to changes made during the display of a media asset. For example, if a recommendation is made to either fast forward the upcoming content or to not skip and watch the upcoming content, and the user decides to override the recommendation and perform an opposite action, such as skip the upcoming content when the recommendation was to watch it, then the system adapts to the changes made and incorporates the changes in making future fast forwarding recommendation.

Figure 2:
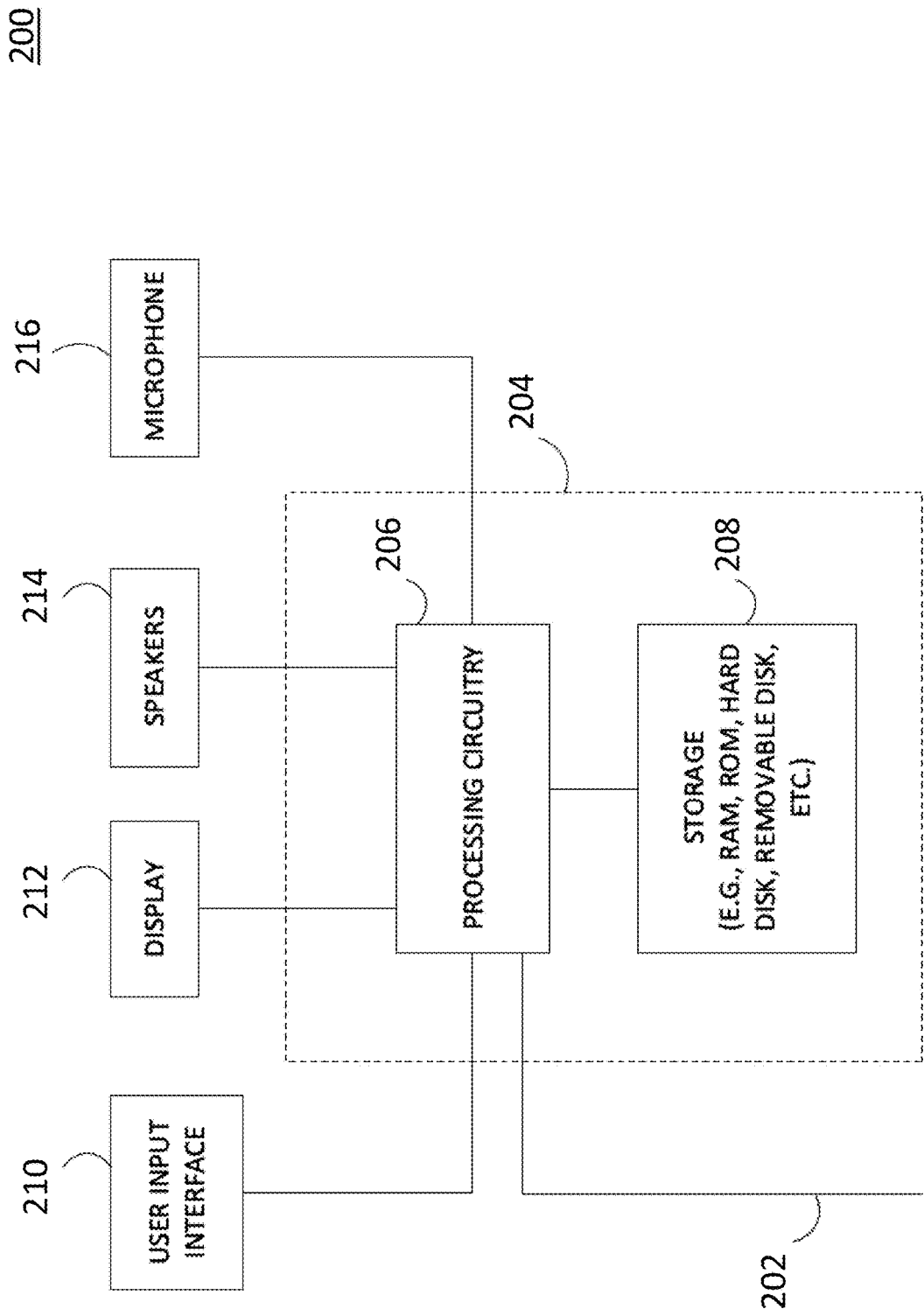
FIG. 2 is a block diagram of a media device, in accordance with some embodiments of the disclosure.

FIGS. 1-2 describe exemplary devices, systems, servers, and related hardware for analyzing rewinded and fast forwarded portions of media assets to obtain metadata for such portions, performing analyses to generate metadata specific to the rewinded and fast forwarded portions, determining attributes present and absent in the rewinded and fast forwarded portions of the media asset, scoring each attribute and to calculate aggregated scores, providing fast forwarding recommendations, automatically fast forwarding portions of the media asset, graphically displaying the amount of time saved when a portion containing an attribute is fast forwarded, using natural language, machine learning, and artificial intelligence algorithms, generating machine learning model based on user consumption history, and executing all the processes described herein, in accordance with some embodiment of the disclosure. In the system 100, there can be more than one user equipment device 102 but only one is shown in FIG. 1 to avoid overcomplicating the drawing. In addition, a user may utilize more than one type of user equipment device and more than one of each type of user equipment device. In an embodiment there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc), or other short-range communication via wired or wireless paths. BLUETOOTH is a certification mark owned by Bluetooth SIG, INC. In an embodiment, the user equipment devices may also communicate with each other directly through an indirect path via the communications network 106.

The user equipment devices may be coupled to communications network 106. Namely, the user equipment device 102 is coupled to the communications network 106 via communications path 104. The communications network 106 may be one or more networks including the Internet, a mobile phone network, mobile voice or data network (e.g., a 4G, 5G, or LTE network), cable network, public switched telephone network, or other types of communications network or combinations of communications networks. The path 104 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment path 104 can be a wireless path. Communication with the user equipment device may be provided by one or more communications paths but is shown as a single path in FIG. 1 to avoid overcomplicating the drawing.

The system 100 also includes media asset sources, such as video asset sources 112, and one or more servers 114, which can be coupled to any number of databases providing information to the user equipment devices. The information sources 112 represent any computer-accessible sources, such as servers, databases, platforms (such as video sharing platforms) that store media assets, such as video assets. The server 114 may store and execute various software modules, such as for example for analyzing rewinded and fast forwarded portions of media assets to obtain metadata for such portions, performing analyses to generate metadata specific to the rewinded and fast forwarded portions, determining attributes present and absent in the rewinded and fast forwarded portions of the media asset, scoring each attribute and to calculate aggregated scores, providing fast forwarding recommendations, automatically fast forwarding portions of the media asset, graphically displaying the amount of time saved when a portion containing an attribute is fast forwarded, using natural language, machine learning, and artificial intelligence algorithms, generating machine learning model based on user consumption history, and transmitting the instructions to a media device for rewinding, fast forwarding, and displaying information relating to fast forwarding. In some embodiments, the user equipment device 102, media asset sources 112, and server 114 may store metadata associated with media assets. In some embodiments, the server may transmit a command to cause the display of a user interface on the display screen of a media asset device or a user's mobile device. The user interface may be used by the user to select preferences, execute commands, and approve or reject various options, such as fast forwarding recommendations. The user interface may also be used by the system to display fast forwarding recommendations, reasons why a recommendation is made, amount of time saved if the portion recommended is fast forwarded, obtain user preferences, or obtain user profile or user consumption history.

FIG. 2 shows a generalized embodiment of a user equipment device 200, in accordance with one embodiment. In an embodiment, the user equipment device 200, is the same user equipment device 102 of FIG. 1. The user equipment device 200 may receive content and data via input/output (I/O) path 202. The I/O path 202 may provide audio content (e.g., broadcast programming, on-demand programming, Internet content, content available over a local area network (LAN) or wide area network (WAN), and/or other content) and data to control circuitry 204, which includes processing circuitry 206 and a storage 208. The control circuitry 204 may be used to send and receive commands, requests, and other suitable data using the I/O path 202. The I/O path 202 may connect the control circuitry 204 (and specifically the processing circuitry 206) to one or more communications paths. I/O functions may be provided by one or more of these communications paths but are shown as a single path in FIG. 2 to avoid overcomplicating the drawing.

The control circuitry 204 may be based on any suitable processing circuitry such as the processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Analyzing rewinded and fast forwarded portions of media assets to obtain metadata for such portions, performing analyses to generate metadata specific to the rewinded and fast forwarded portions, determining attributes present and absent in the rewinded and fast forwarded portions of the media asset, scoring each attribute and to calculate aggregated scores, providing fast forwarding recommendations, automatically fast forwarding portions of the media asset, graphically displaying the amount of time saved when a portion containing an attribute is fast forwarded, using natural language, machine learning, and artificial intelligence algorithms, generating machine learning model based on user consumption history and executing all the processes described herein can be at least partially implemented using the control circuitry 204. The processes as described herein may be implemented in or supported by any suitable software, hardware, or combination thereof. They may also be implemented on user equipment, on remote servers, or across both.

In client-server-based embodiments, the control circuitry 204 may include communications circuitry suitable for communicating with one or more servers that may at least implement the storing of the media assets, instructions and recommendations for fast forwarding, attributes and attribute tables, scores relating to attributes, user profiles, machine learning and artificial intelligence programs, and related functions and processes as described herein. The instructions for carrying out the above-mentioned functionality may be stored on the one or more servers. Communications circuitry may include a cable modem, an integrated service digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 208 that is part of the control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum storage devices, gaming consoles, gaming media, or any other suitable fixed or removable storage devices, and/or any combination of the same. The storage 208 may be used to store various types of content described herein. Nonvolatile memory may also be used (e.g., to launch a boot-up routine and other instructions). Cloud-based storage, described in relation to FIG. 1, may be used to supplement the storage 208 or instead of the storage 208.

The control circuitry 204 may include audio generating circuitry and tuning circuitry, such as one or more analog tuners, audio generation circuitry, filters or any other suitable tuning or audio circuits or combinations of such circuits. The control circuitry 204 may also include scaler circuitry for upconverting and down converting content into the preferred output format of the user equipment device 200. The control circuitry 204 may also include digital-to-analog converter circuitry and analog-to-digital converter circuitry for converting between digital and analog signals. The tuning and encoding circuitry may be used by the user equipment device 200 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 208 is provided as a separate device from the user equipment device 200, the tuning and encoding circuitry (including multiple tuners) may be associated with the storage 208.

The user may utter speech to the control circuitry 204, which is received by the microphone 216. The microphone 216 may be any microphone (or microphones) capable of detecting human speech. The microphone 216 is connected to the processing circuitry 206 to transmit detected voice commands and other speech thereto for processing. In some embodiments, voice assistants (e.g., Siri, Alexa, Google Home and similar such voice assistants) receive and process the voice commands and other speech.

The user equipment device 200 may include an interface 210. The interface 210 may be any suitable user interface, such as a remote control, mouse, trackball, keypad, keyboard, touch screen, touchpad, stylus input, joystick, or other user input interfaces. A display 212 may be provided as a stand-alone device or integrated with other elements of the user equipment device 200. For example, the display 212 may be a touchscreen or touch-sensitive display. In such circumstances, the interface 210 may be integrated with or combined with the microphone 216. When the interface 210 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 210 may be HDTV-capable. In some embodiments, the display 212 may be a 3D display. The speaker (or speakers) 214 may be provided as integrated with other elements of user equipment device 200 or may be a stand-alone unit. In some embodiments, the display 212 may be outputted through speaker 214.

The user equipment device 200 of FIG. 2 can be implemented in system 100 of FIG. 1 as user equipment device 102, but any other type of user equipment suitable for analyzing rewinded and fast forwarded portions of media assets to obtain metadata for such portions, performing analyses to generate metadata specific to the rewinded and fast forwarded portions, determining attributes present and absent in the rewinded and fast forwarded portions of the media asset, scoring each attribute and to calculate aggregated scores, providing fast forwarding recommendations, automatically fast forwarding portions of the media asset, graphically displaying the amount of time saved when a portion containing an attribute is fast forwarded, using natural language, machine learning, and artificial intelligence algorithms, generating machine learning model based on user consumption history, and executing all the processes described herein.

It may also be implemented in system 100 as user equipment device 102, but any other type of user equipment suitable for executing the functions and processes described herein. For example, user equipment devices such as television equipment, computer equipment, wireless user communication devices, or similar such devices may be used. User equipment devices may be part of a network of devices. Various network configurations of devices may be implemented and are discussed in more detail below.

Figure 3:
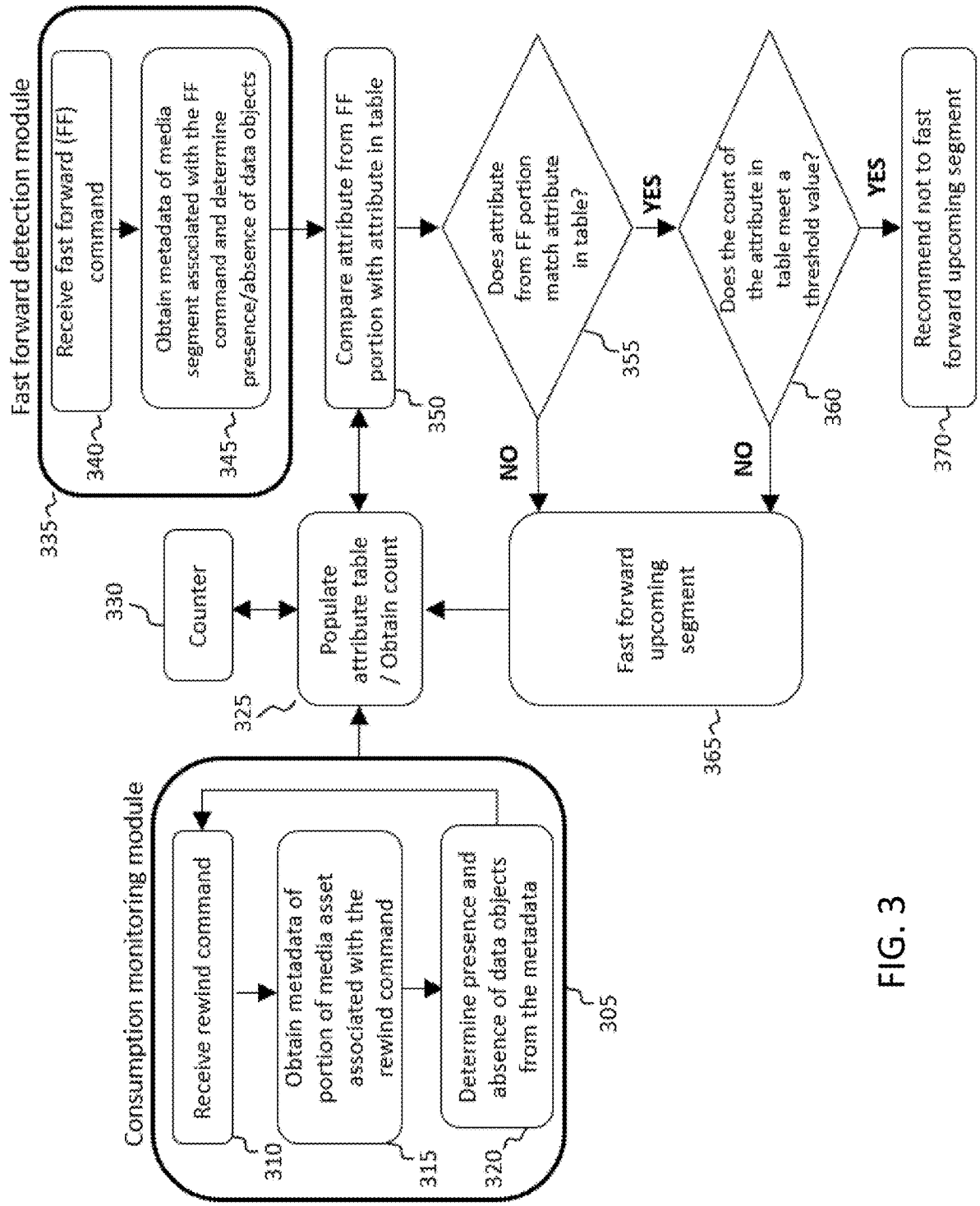
FIG. 3 is flowchart of a process for providing fast forwarding recommendations, in accordance with some embodiments of the disclosure.

FIG. 3 is block diagram of a process for providing fast forwarding recommendations, in accordance with some embodiments of the disclosure. The process involves determining the interests (and lack of interest) of a user that is viewing the media asset and when an upcoming segment contains content that is likely to be of interest to the user, then the system alerts the user of such content, provides information relating to the content, and in some instances prevents the fast forwarding of the upcoming content unless the user overrides a recommendation not to fast forward. If the user overrides the recommendation, i.e., the system receives an opposite action from what was recommended, e.g., a recommendation was made to fast forward or skip the upcoming portion, however, the user decided to override the recommendation and watch the upcoming portion, then the system adapts to the changes made, also referred to as adaptive fast forwarding, and incorporates the changes in making future fast forwarding recommendation.

Although the description, for simplicity, refers to providing for display on the user device a recommendation to not fast forward or not to skip, where the recommendation is implemented only after user input, the process described in this figure also relates to automatically forwarding an upcoming portion, without user input, when a determination is made that the upcoming portion contains content that is likely not of interest to the user.

Figure 4:
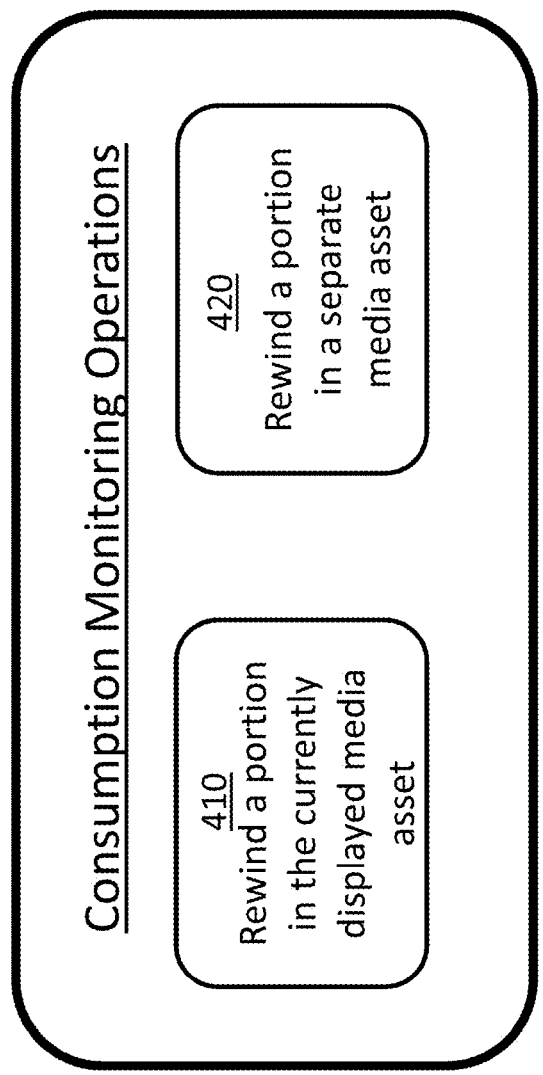
FIG. 4 is block diagram of some rewind operations relating to rewinding a portion of the media asset, in accordance with some embodiments of the disclosure.

The process begins a block 310 where block 310-320 may be performed by a consumption monitoring module 305, which is part of the system as depicted in FIG. 1. In one embodiment, the consumption monitoring module 305 may store instructions that when executed would perform the functions as depicted in blocks 310-320. Some exemplary operations performed by the consumption monitoring module are depicted in FIG. 4.

At block 310 the consumption monitoring module 305 may receive a rewind command. As depicted in FIG. 4, in some embodiments, the rewind command may be associated with rewinding a portion of the media asset that is currently displayed 410. In this instance, a user watching a portion of the media asset may find the portion of interest and decide to rewind and watch that portion for a second time. For example, the user may like a scene depicted in the media asset that the user has recently consumed and decide to rewind and watch the scene for a second time. The scene may contain anything from an actor or actress that the user likes, a location shown in the scene, an action that occurs in the scene, a critical component or plot of the movie, or any other attribute in the scene that this user finds of interest. In some embodiments, the scene may relate to key portions of a game that the user has enjoyed watching and decided to rewind and watch for a second time.

Regardless of the reason for the rewinding and rewatching the scene (i.e., portion of the media asset) for one or more times, once a rewind command is detected, the system through the consumption monitoring module, at block 315 obtains metadata of the portion of the media asset that is associated with the rewind. The portion for which the metadata is obtained is from the current play position to a prior play position to which the media asset was rewinded. For example, if the current play position is at 17 minutes and a 2 minute portion of the media asset was rewinded, then the metadata from time marker 15 minutes to 17 minutes would be obtained.

In some embodiments, metadata relating to the rewinded portion of the media asset may not be available. In other embodiment, the metadata may be available, however it may be limited or too general and may not be thorough enough to accurately represent the specific portion of the media asset that was rewinded.

In other embodiments, even if metadata for the rewinded portion is available, it is likely that metadata would be related to only data objects that are depicted in the rewinded portion and metadata relating to the absence of data objects may not be available. For example, metadata for a rewinded portion of the media asset that depicts an action scene with Tom Cruise and other actors may indicate the presence of the following attributes: Tom Cruise, action, and names of the other characters. However, additional metadata to indicate that the scene does not include a car chase may not be available and when the user has indicated that they like scenes that involve Tom Cruise and car chase, then such metadata may be useful in determining whether to fast forward.

As such, when such metadata is not available, or not adequate enough to represent the specific portion of the media asset that was rewinded, then the system, through the control circuitry 204, may perform audio, video, and/or textual analysis to generate additional metadata that would be representative of the rewinded portion. A determination whether the data is adequate may be made by determining if metadata is available for the specific portion of the media asset where a rewind is detected. The analysis to gather additional metadata may also be performed when metadata available data does not represent the presence of a data object or the absence of a data object that was previously liked by the user.

This additional metadata generated would be representative of the rewinded portion and provide a deeper insight. The additional metadata obtained through this analysis may be added to the media asset or stored in a separate file in a database associated with the system, for example, it may be stored in storage 208 of FIG. 2.

In some embodiments, in order to generate the additional metadata, the system may perform audio analysis of the specific portion that was rewinded. The audio analysis may include analyzing the speech portion of the rewinded portion by using natural language processing (NLP) and artificial intelligence (AI) algorithms to process the speech and determine the presence and absence of attributes in the specific portion that was rewinded.

In another embodiment, image or video analysis may be performed to generate the additional metadata for the specific portion that was rewinded and consumed. In this embodiment, the control circuitry 204 may perform an image or video analysis to process the images and scenes in the specific portion that was rewinded and consumed to determine the presence and absence of attributes in the specific portion that was rewinded. The control circuitry 204 may use available image processing tools to perform the analysis.

In yet another embodiment, when a closed caption file for the media asset is available, NLP may be used by the control circuitry 204 to perform a textual analysis of the closed caption file to determine the presence and absence of attributes in the specific portion that was rewinded. When performing audio, video/image, and textual analysis, and when determining the absence of a data object, the system may limit its generation of metadata to only those data objects that were previously identified in the user's profile or part of the user's consumption history. For example, if the user profile indicates that the user likes to watch action scenes, then in a currently displayed action movie, when a rewind is detected, the system determines the presence and absence of action in the portion rewinded.

At block 320, the system determines the presence and absence of data objects from the metadata relating to the rewinded portion. As mentioned earlier, the metadata may be available as part of the media asset, through the platform at which the media asset is offered for consumption, or through audio, video/image analysis, or textual analysis. The system may then generate an attribute table to identify the data objects that are present and absent from the portion of the media asset that was rewinded and consumed.

Figure 5:
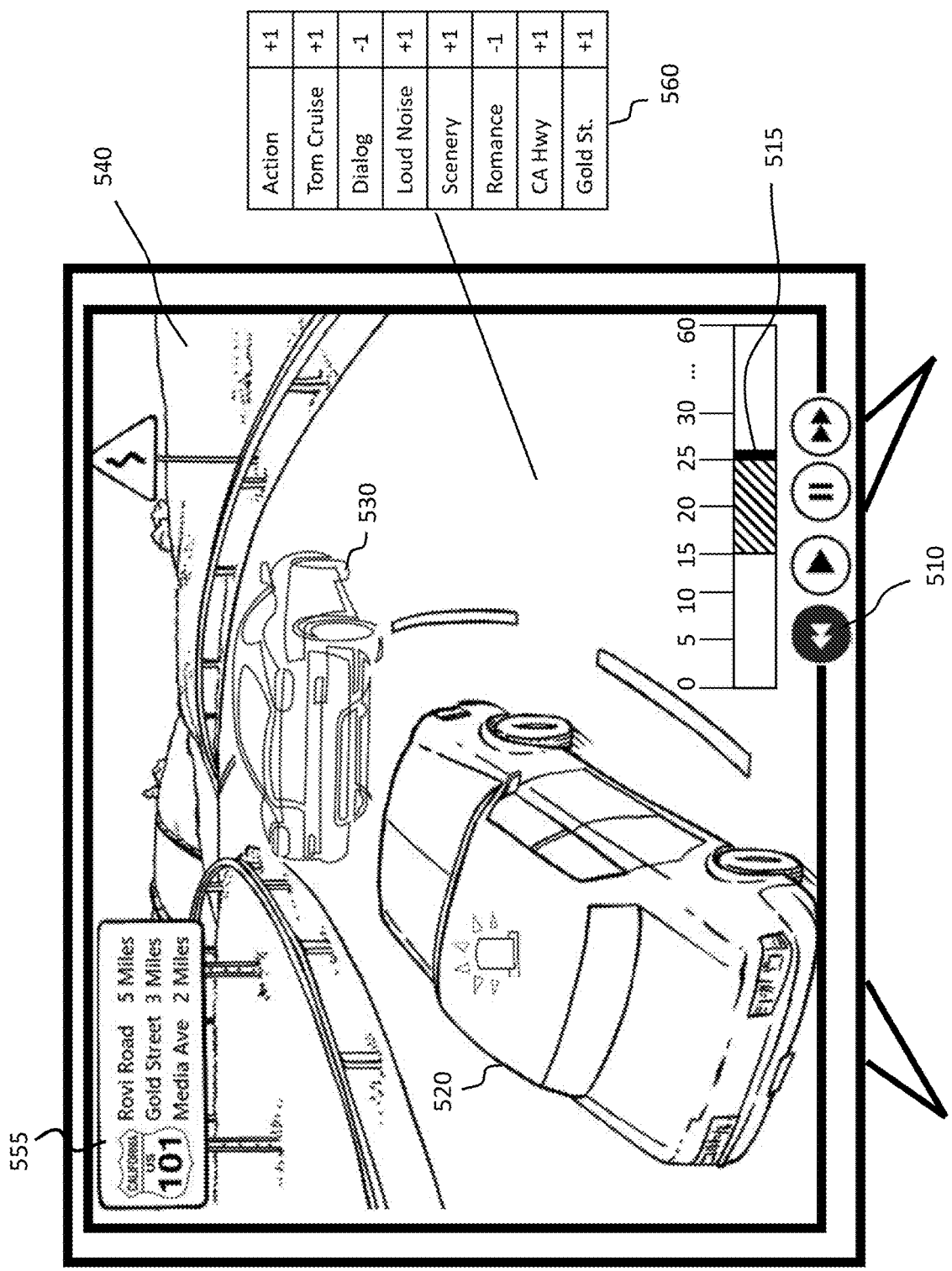
FIG. 5 is a video frame of a media asset and its associated attribute chart, in accordance with some embodiments of the disclosure.

One example of the attribute table is depicted in FIG. 5 at block 560. The attribute table 560 may be generated by the consumption monitoring module 305, such as through use of the control circuitry 204, by applying the steps depicted in blocks 310-330 of FIG. 3. Other examples of attribute tables are provided in FIGS. 14 and 15.

In this example of FIG. 5, activation of rewind button on a media device was detected, as shown by the rewind icon 510. The rewind command for the media asset, which is 60 minutes long, was executed at a play position of 25 minutes from the start of the media asset. As depicted at 515, the portion that was rewinded was a period of 10 minutes. As such the period rewinded and consumed by the user was from play position 15 minutes to play position 25 minutes.

During the 10-minute rewind and consumption, i.e., from play position 15 minutes to play position 25 minutes, the scenes depicted in the rewinded portion of the media asset include a police car 520 chasing a sports car 530 that is being driven by Tom Cruise in the hills 540 of Hwy 101 (555). As further depicted by the highway sign 555, the location of the scene seems to be about 5 miles from Rovi road, 3 miles from Gold St, and 2 miles from Media Ave.

Based on the portion of the media asset that was rewinded and consumed, the system may generate the attribute table 560. The attribute table may indicate the presence of certain data objects, such as action, Tom Cruise, loud noise, scenery, California highway, and Gold St. The attribute table may also list additional attributes from the rewinded portion of the media assets.

An artificial intelligence algorithm (AI) may be used to determine key attributes of the scenes such that they are captured. For example, although other attributes are depicted, such as a railing on the side of the highway and a road sign showing that the road is curvy ahead, the AI algorithm may determine that those attributes are not relevant to the context of the scene and not important to the user. The AI algorithm may determine what is relevant and important based on the consumption history of the user, the user's profile, and context of the scene. The attributes listed in the attribute table that are present in the scene may be given a score of +1 for each appearance.

In some embodiments, based on the scenes relating to the portion of the media asset that was rewinded and consumed, the system may list certain data objects that are not depicted in the scenes. For example, the system may list that dialogue and romance are not depicted in the rewinded portion of the media asset. In order to determine what data objects to list in the attribute table as absent from the scenes, the AI algorithm may base such a decision on the user's profile and consumption history, which may indicate that the user usually enjoys romantic scenes. As such, the AI algorithm may list the absence of the romantic scene in the attribute table, i.e., that the rewinded portion does not a romantic scene. Since the romantic scene is absent, the absence is listed in the attribute table with a score of "−1."

Figure 6:
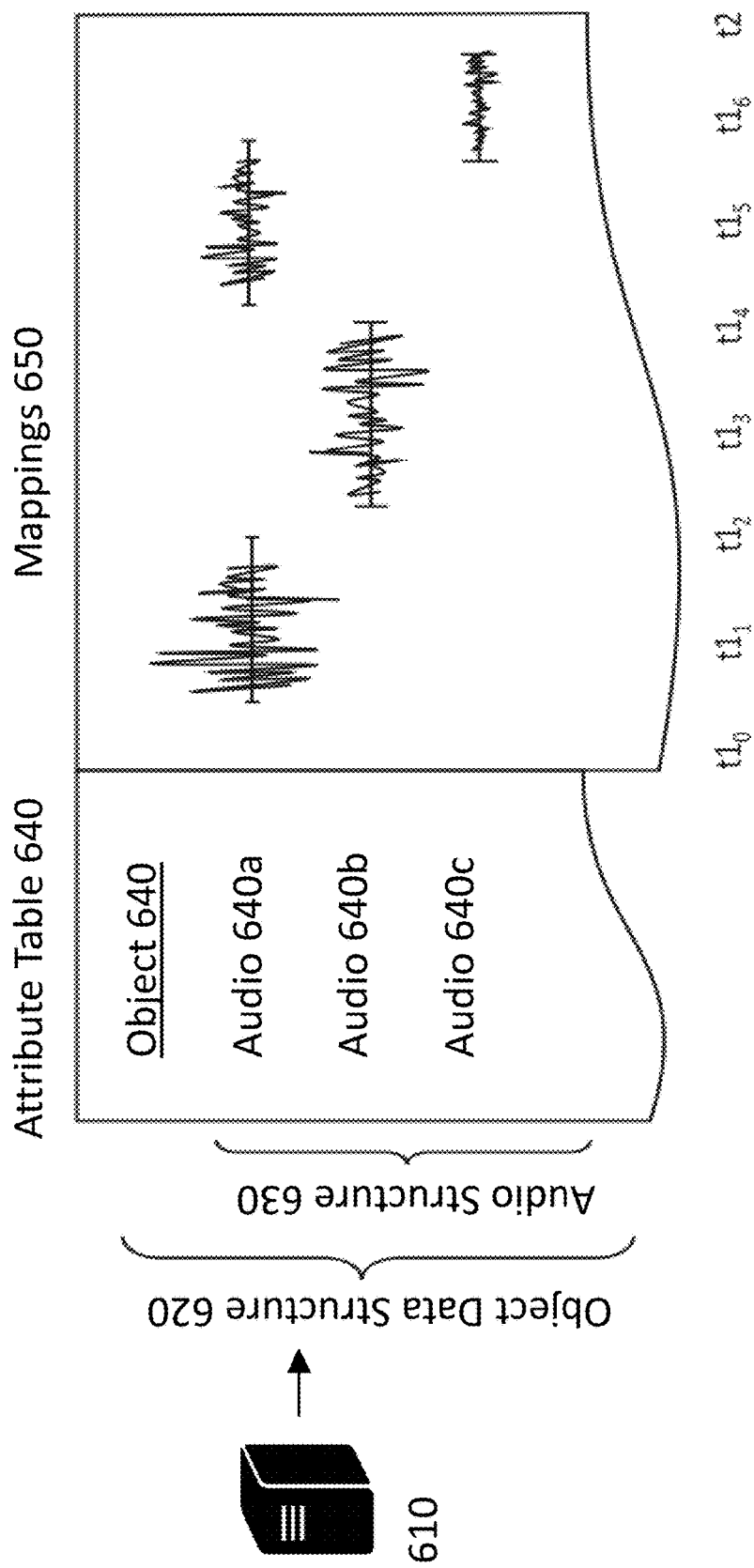
FIG. 6 is block diagram of a content structure, in accordance with some embodiments of the disclosure.

Another example of an attribute table is depicted in FIG. 6. As depicted, the attribute table 640 is part of an exemplary content structure 600. The table depicts the mapping of a data object 640 over a course of time $t1_0$ to t2. In this example, the metadata for the attribute table is derived from analyzing the audio/speech within the $t1_0$ to t2 time period. The audio structure 630 is part of the object data structure 620. In addition to an audio structure 630, the object data structure 620 may include other structures, such as structures based on image/video and text of the rewinded portion that are associated with the object 640.

In one embodiment, audio tracks 640a-c, may refer to dialogue spoken by Tom Cruise in the media asset. In this example, the media asset may have been rewinded multiple times during its display. As such each audio track 640a-c is mapped to a time $t1_0$ to t2 that refers to each rewind in the media asset during which a dialogue from Tom Cruise was present. For example, audio track 640a represents an object 640, which is a dialogue involving Tom Cruise, that is mapped in its first instance between time $t1_1$ to $t1_2$. The time period is a smaller portion of time within the total rewinded portion, i.e., if the rewinded portion is 7 minutes, the dialogue involving Tom Cruise may be 1 minute within the 7 minute rewinded portion and the mapping would indicate the exact play position of Tom Cruise's dialogue within the 7 minute rewinded portion.

Figure 7:
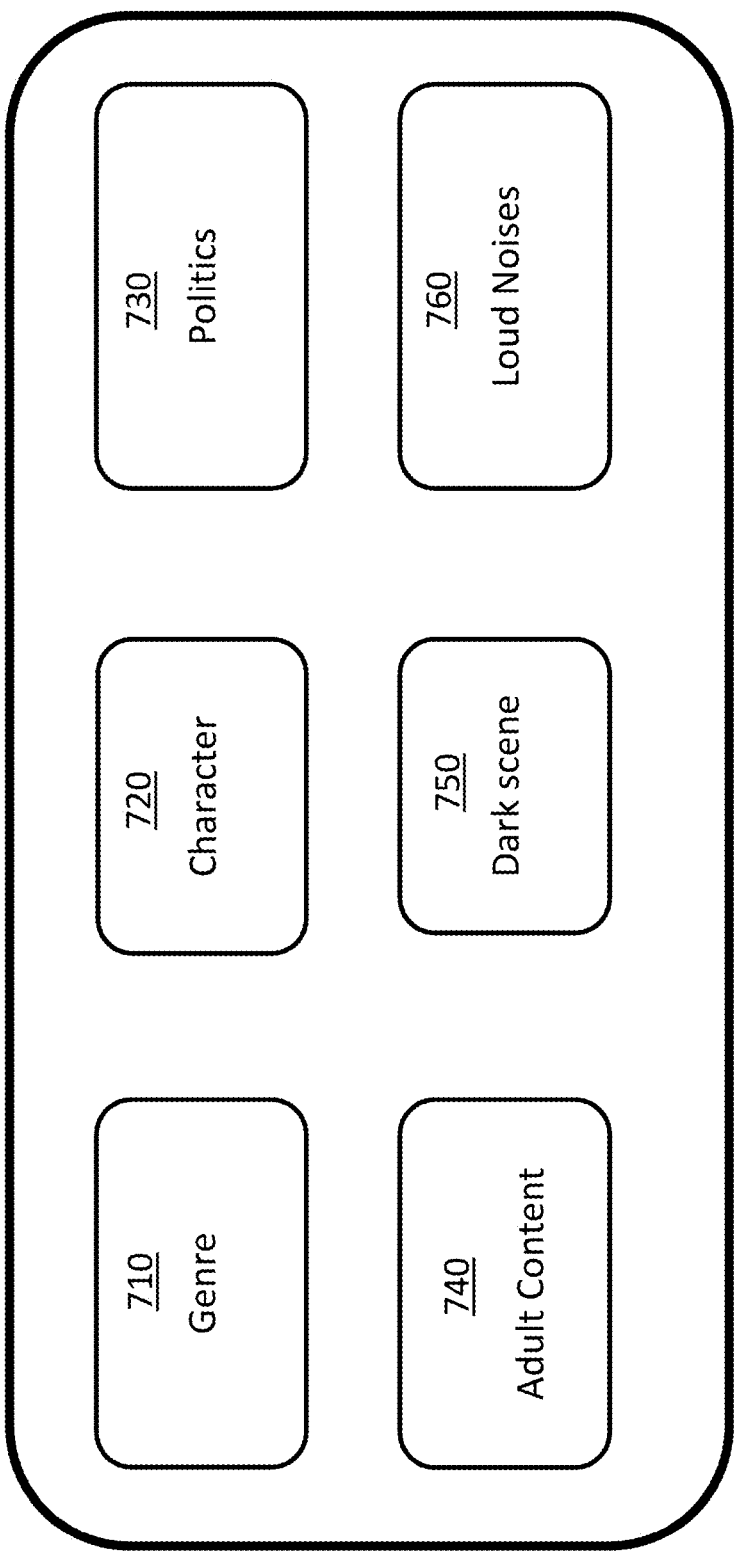
FIG. 7 is a block diagram of a plurality of attribute categories that may be included in an attribute table, in accordance with some embodiments.

As referred to earlier, the attribute table indicates the presence and absence of data objects. Some exemplary categories of data objects that can be listed in the attribute table are depicted in FIG. 7. For example, in a rewinded portion, one category for which the presence or absence of a data object is determined may include genre 710. The user may be interested in a certain type of genre and not interested in another type of genres. As such the system may determine whether a rewinded portion of the media asset includes a genre of interest, and if so, score at positively (e.g., +1) and if it does not include a genre of interest then score it negatively (e.g., −1). Other types of scoring are also contemplated.

Another exemplary category for which the presence or absence of a data object is determined may include character 720. The user may be interested may include a specific character, actor, or actress. For example, if the user enjoys watching Tom Cruise, then the system would detect the absence and presence of Tom Cruise in each rewinded portion. If the rewinded portion includes Tom Cruise, then it will be scored positively, and if it does not include Tom Cruise then you it will be scored negatively. The count in an attribute table that has Tom Cruise as the attribute will be updated with each positive and negative scoring of Tom Cruise.

Other exemplary categories for which the presence or absence of a data object is determined may include a topic, such as politics 730, adult content 740, dark scenes 750, loud noises 760, and any other user data objects that are liked or disliked by the user, e.g., violence, nudity etc.

Referring back to FIG. 3, at block 325, the attribute table is created and populated. The presence of a data object in the rewind portion, as described above, is counted as a "+1" for each presence of a data object and as a "−1" for each absence of a data object. A counter 330 is used two increment or decrement the count over a period of time as multiple rewinds and data objects associated with the multiple rewinds are analyzed. For example, in a media asset, the first rewind may depict the presence of a data object such as a police car in a scene. A second rewind later in the media asset may also detect the presence of a police car in the scene. As such, the counter 330 may increment the count from a "+1" to a "+2" since there were two occurrences in which the presence of the data object (the police car) was depicted in the rewinded portions of the media asset.

The data gathered through blocks 310-320 and populated in block 325 may be inputted into a machine learning algorithm. In one embodiment, the machine learning engine has instructions store therein that execute the machine learning algorithm. The machine learning engine gathers data over a period of time for each rewind detected. Data objects that are present and absent in each rewinded portion of the media asset are determined and an attribute table is populated based on this data gathered. The machine learning algorithm is trained and refined and its probability and confidence level increase as more and more attribute presence and absence data are inputted into the model. For example, if several rewinds are detected, and in 8 out of 10 rewinds the portions of metadata obtained relating to the rewinded portions indicate the absence of violence, then the machine learning model's confidence level is increased and its probability in predicting that a user likely has an interest in viewing a portion of the media asset that does not have violence is also increased, as oppose to only having two occurrences in which violence was not present.

The machine learning engine collects rewind data on an ongoing basis, or a periodic basis, to train and enhance the algorithm such that predictions on the user's likes and dislikes, which translate to whether an upcoming portion of the media asset should be watched or forwarded, are performed with a higher confidence.

Although reference has been made in blocks 310-320 and 325 to multiple rewinds in the same media asset, as depicted in block 420 of FIG. 4, the process of blocks 310-320 can also be applied to rewinds and consumed portion of other media assets. For example, if a user has previously consumed a movie and rewinded a portion of the movie that included scenes from Paris, France, then such data is captured and populated into the attribute table and also used by the machine learning algorithm. Capturing such data from other separate media assets allows the system to collect data of the user's likes over a time period and in different contexts thereby its ability to better predict if an upcoming portion may be liked or disliked by the user.

Blocks 340-345 relate to the fast forward detection module 335. The data collected, analyzed, and populated in blocks 310-320 and 325, which is also used for machine learning, is applied to data collected based on clocks 340-345 such that a determination can be made whether an upcoming segment should be fast forwarded. The data collected also allows the system to provide basis of any forwarding recommendation made, such as to not fast forward because the segment contain a dialogue involving Tom Cruise.

Figure 8A:
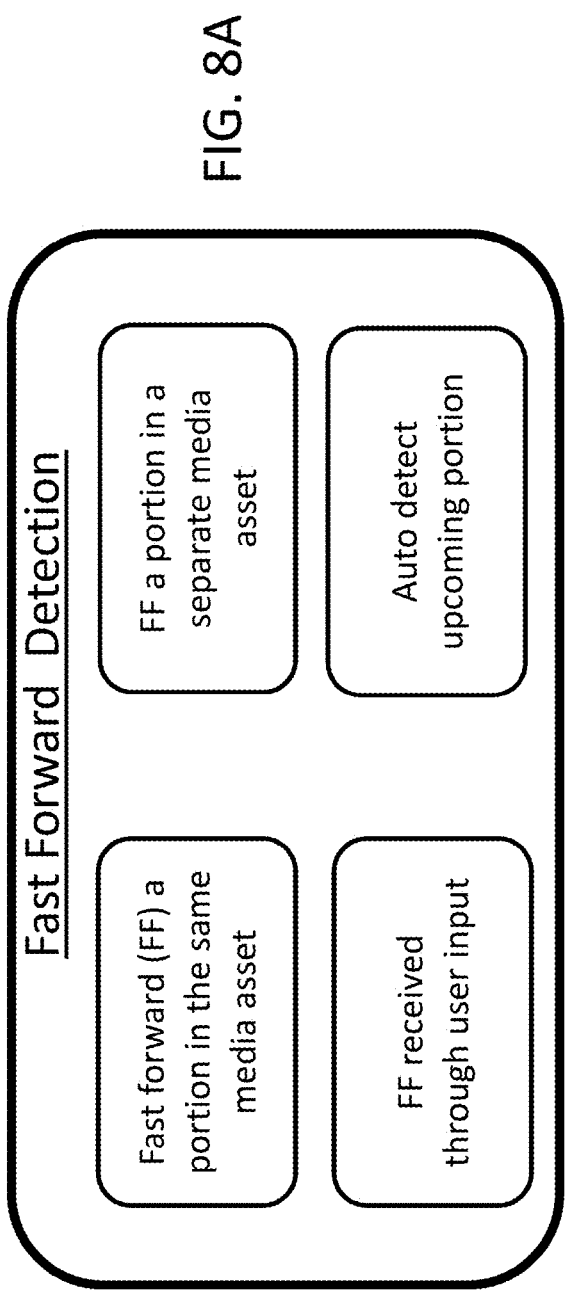
FIG. 8A is a block diagram of a plurality of fast forward operations relating to fast forwarding a portion of a media asset, in accordance with some embodiments of the disclosure.

At block 340, a fast forward command is received. As depicted in FIG. 8A, the fast forward command may be received in the same media asset in which a rewind was earlier performed or may be receive in a separate media asset in which an earlier rewind was not performed.

At block 345, the system, through use of the control circuitry 204, determines the presence and absence of data objects from the metadata relating to the fast forward portion. In some embodiment, the metadata specific to the portion of the fast forward may be available and in other embodiments, such specific data may not be available. When such data is available, the system may generate an attribute table, similar to the attribute table generated for a rewind portion, to identify the data objects that are present and absent from the portion of the media asset that is to be fast forwarded.

In some embodiments, metadata relating to the portion that is to be fast forwarded may not be available. In other embodiment, the metadata may be available, however it may be limited or too general and may not be thorough enough to accurately represent the specific portion of the media asset that is to be fast forwarded. In yet other embodiments, even if metadata for the fast forward portion is available, it is likely that metadata would be related to only data objects that are depicted in the fast forward portion and metadata relating to the absence of data objects may not be available.

As such, when such metadata is not available, or not adequate enough to represent the specific portion of the segment to be fast forwarded, the system may perform audio, video, and/or textual analysis to generate additional metadata that would be representative of the portion to be fast forwarded. In one embodiment the system may determine that adequate metadata is not available since metadata specific to the fast forward segment is not available. The additional metadata obtained through this analysis may be added to the media asset or stored in a separate file in a database associated with the system, such as database 113 in FIG. 1.

Use of NLP and AI and other analyses tools and processes described earlier in the rewind portion may also be applied in the portion to be fast forwarded to determine the presence and absence of attributes in the specific portion that is to be fast forwarded.

At block 350, attributes from a portion of the media asset that is to be fast forwarded are compared with attributes in the populated table. As mentioned earlier, the attribute table is populated based on the user's consumption history of rewinding and consuming specific portions of media assets. It is indicative of the user's interest in content that was included in the rewinded portion. The attribute table may also have been populated based on NLP and AI analysis performed on the user's profile and/or based on user's consumption history. Such comparison allows the system to ensure that an attribute that is of interest to the user is not skipped unknowingly through the fast forwarding of the media asset. As such, the comparison ensures that if the attribute that is liked by the user is present in a portion that is to be fast forwarded by the user, then the system would alert the user of the presence of such attributes and provide information related to the attribute, such that the user is aware of its presence and may decide appropriately whether or not to fast forward the upcoming portion which includes the liked attribute.

At block 355, a determination is made whether an attribute from the portion of the media that is to be fast forwarded matches an attribute in the attribute table. If the attribute in the portion to be fast forwarded does not match an attribute in the attribute table, and the fast forward portion contains new attributes that are not in the attribute table, then at block 365 the fast forward command is executed and the play position in the media asset is moved to a new fast forwarded position. Since fast forwarding relates to lack of interest in a particular content, the newly discovered attributes in the current fast forward are listed in the attribute table and the data related to the newly discovered attributes are fed into the machine learning algorithm such that future portions of the media asset that contain the newly found may be utilized to make fast forwarding recommendations and decisions.

If at block 355 an attribute in the fast forwarding portion matches an attribute in the attribute table, then at block 360 a determination is made whether the count of the attribute in the table meets a threshold value. In some embodiments it may be sufficient for the attribute in the fast forwarding portion to match an attribute in the attribute table and as such a recommendation not to fast forward, i.e. skip the fast forward, the upcoming portion may be made or the upcoming portion may be automatically fast forwarded without providing the recommendation.

In other embodiments, if the count of the attribute in the attribute table does not meet a threshold value, then a recommendation not to fast forward, i.e., skip the fast forward and watch the upcoming portion, may not be made. The threshold ensures that a listing in the attribute table is not an outlier and is representative of the user's consumption pattern. For example, if an attribute, such as the location which may be Chicago, is present in the rewinded portion and the count of location Chicago is +1, which indicates that only one rewind performed by the user included the location Chicago, then it is possible that Chicago may just be the backdrop for another attribute in the scene that is of interest and Chicago specifically may not be of interest to the user. However, if Chicago is present in multiple rewinds, then the probability that Chicago is of interest to the user is increased. The threshold provides a higher confidence level when an attribute, such as the Chicago location, is listed in the attribute table multiple times indicating a higher probability that Chicago is of interest to the user and not some other attribute in the rewinded portion in which Chicago just happens to be in the backdrop.

Another example of block 355 and 360, where an attribute from the portion to be fast forwarded is matched with an attribute in the attribute table is described in FIG. 9. It should be noted that process 900, or any step thereof, could be performed on, or provided by, any of the systems and devices shown in FIGS. 1-2. For example, process 900 may be executed by control circuitry 204 as instructed by a media guidance application implemented on user equipment depicted in FIG. 1.

At step 902, the media guidance application retrieves a user profile that indicates that the user previously rewinded and consumed a portion of the media asset. For example, the media guidance application may access, using control circuitry 204, a remote or local data storage location (e.g., media guidance data source via communications network 106 or storage 208) to retrieve a user profile associated with the user. The media guidance application may select, using the methods described above, the same media asset or a separate media asset previously rewinded and consumed as indicated in the description of FIG. 4.

At step 904, the media guidance application may detect that the user is about to consume an upcoming portion of a media asset and analyze the upcoming portion before its consumption.

In one example, the media guidance application may detect and analyze, using control circuitry 204, at user input interface 210 request from a user to consume a portion in a separate media asset, where separate media asset relates to a media asset in which a previous rewind and consume operation was not performed. The detection may be based on a network packet containing a request from a user to consume a separate media asset. The detection may also be based on user input in a graphical user interface displayed on the user's electronic device. The detection may also be based on voice input at user input interface 210. The detections may be processed, using processing circuitry 206, to determine a separate media asset requested by a user.

In one embodiment, the media guidance application may detect, using control circuitry 204, at user input interface 210 request from a user to consume an upcoming segment in the same media asset. The request from the user may have been received in response to the user have resuming play from an earlier play position at which the media asset was exited or the user selecting a specific play position from a menu of offerings and launching the media asset from the desire play position.

In yet another embodiment, the media guidance application may detect, using control circuitry 204, on its own, and without any user input, attributes of the next portion of the media asset that is to be displayed. In this example, the media asset may be in its play mode which allows the media asset to continuing playing from one portion to the next portion until its completion, and as such, the control circuitry 204 may detect on its own attributes of the next upcoming portion to be displayed.

Regardless of the method selected through which a request for playing the next portion of the media asset is received, at block 906, the media guidance application may use control circuitry 204 to identify a portion of the upcoming media asset for comparing to a previously rewinded portion of the media asset to determine whether attributes in the upcoming portion of the media asset match attributes from the previously rewinded and consumed portions of the media asset. For simplification, a previous rewind operation in which a portion of the media asset was rewinded and consumed is discussed below, however, the process may also be applied to a rewind operation performed in a separate media asset previously consumed by the user.

The media guidance application may compare a frame of the rewinded portion of the media asset to a frame in the upcoming portion of the media asset. The media guidance application my access a database, remote or local to the media guidance application, (e.g., media guidance data source 112 or database 113 of FIG. 1) to retrieve a plurality of frames associated with the rewinded portion of the media asset.

Other methods of comparison may include comparing the attributes in the upcoming portion to the attribute table, which is populated based on attributes extracted from one or more previously rewinded and consumed portions of the media asset. For example, the attribute table may include the presence or absence of a data object as depicted in the attribute table of FIG. 5, and the attribute may be selected from a plurality if categories as depicted in FIG. 7. In one embodiment, one exemplary comparison may be for an attribute of "Tom Cruise" being present or absent, i.e., if a rewind includes an attribute "Tom Cruise" in the rewinded frame then a upcoming frame also including the attribute "Tom Cruise" will result in an attribute match and likewise if a rewind includes an absence of attribute "Tom Cruise" in the rewinded frame, i.e. Tom Cruise is not displayed in a frame that was rewinded, then a upcoming frame that does not include the attribute "Tom Cruise" will result in an attribute match. The media guidance application may use control circuitry 204 for performing any of the methods described above for the comparing. As a result of the comparing, the media guidance application may generate for display a matched attribute table that include attributes from previous rewinds and attributes in the upcoming portion of the media asset.

Referring back to FIG. 3, if a determination is made that the count of the attribute in the attribute table meets a threshold value, then the system may display on the user's device a recommendation not to fast forward the upcoming segment, i.e., not to skip the upcoming portion since it contains an attribute that was previously watched or noted as of interest to the user, such as in the user's profile. The system may also provide details relating to the recommendation as to why it does not recommend fast forwarding/ skipping the upcoming portion. For example, the system may indicate the presence of Tom Cruise, which was previously liked, rewinded, and rewatched by the user, as the reason why skipping the upcoming portion was not recommended.

Figure 8B:
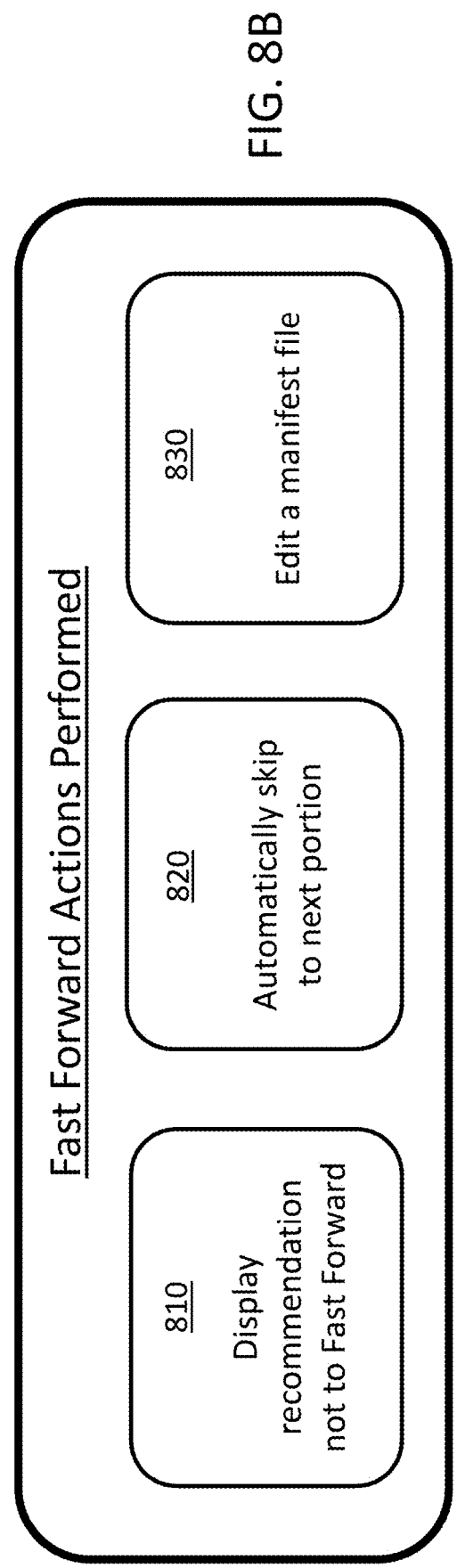
FIG. 8B is another block diagram of a plurality of fast forward operations relating to fast forwarding a portion of a media asset, in accordance with some embodiments of the disclosure.

Fast forwarding actions, including an action that provides a recommendation not to fast forward are further described in FIG. 8B. As described above, the recommendation sent to the user device may be to not fast forward, as depicted in block 810, i.e., not skip the upcoming portion, as it likely contains content of interest, and instead recommend watching the next portion. In this embodiment, the user may also be provided an option to override the recommendation and watch the upcoming content. If the user selects to override the recommendation, the data relating to the override may be provided to the machine learning engine such that future fast forwarding recommendations may take into account details with respect to overriding of the recommendation. For example, the machine learning algorithm may determine that a same segment that is fast forwarded by the user during weekdays is overwritten and watched during weekends. The machine learning algorithm, along with the AI algorithm, may determine that the user prefers to watch media assets in a shorter amount of time during weekdays due to their busy schedule and watch it in full without fast forwarding on weekends when the individual has more leisure time. Other conclusion may also be drawn by the AI algorithm and used for future predictions, such as making a different recommendation based on the time of day, day of the week, when the user is at home versus when the user is travelling, and other such variations learned based on user consumption pattern.

Figure 10:
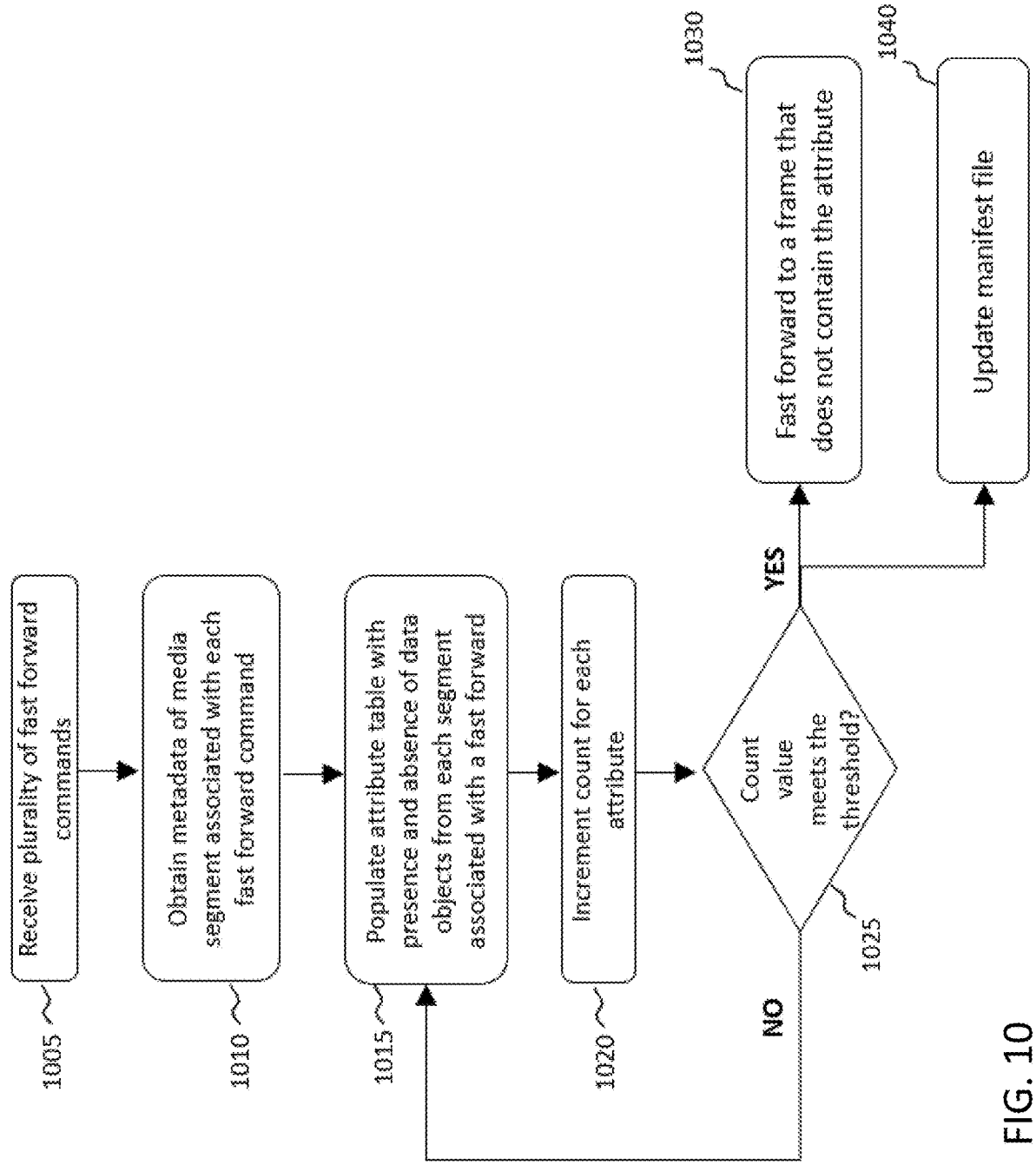
FIG. 10 is flowchart of a process for collecting fast forward data and using it to make fast forwarding predictions and recommendations, in accordance with some embodiments.
Figure 11:
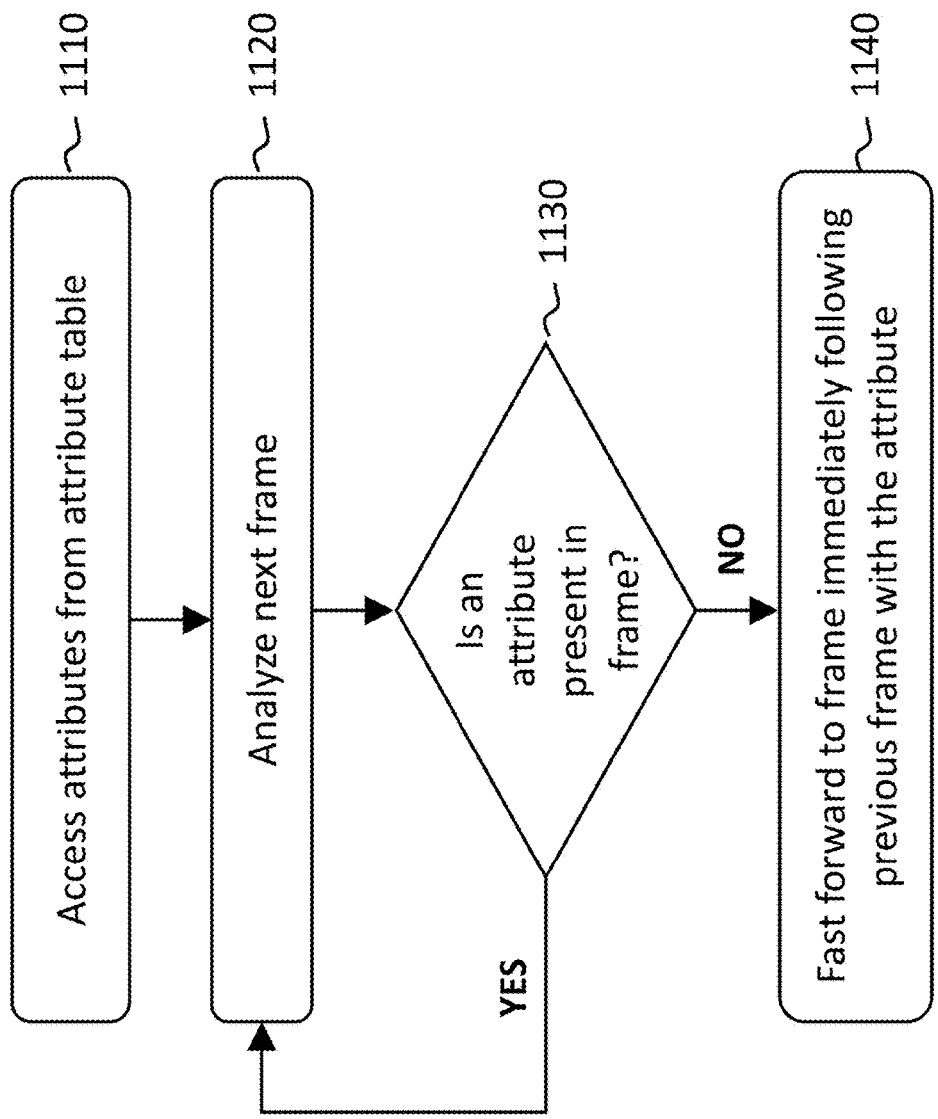
FIG. 11 is flowchart of a process for frame-by-frame analysis of an upcoming portion of the media asset, in accordance with some embodiments.
Figure 12:
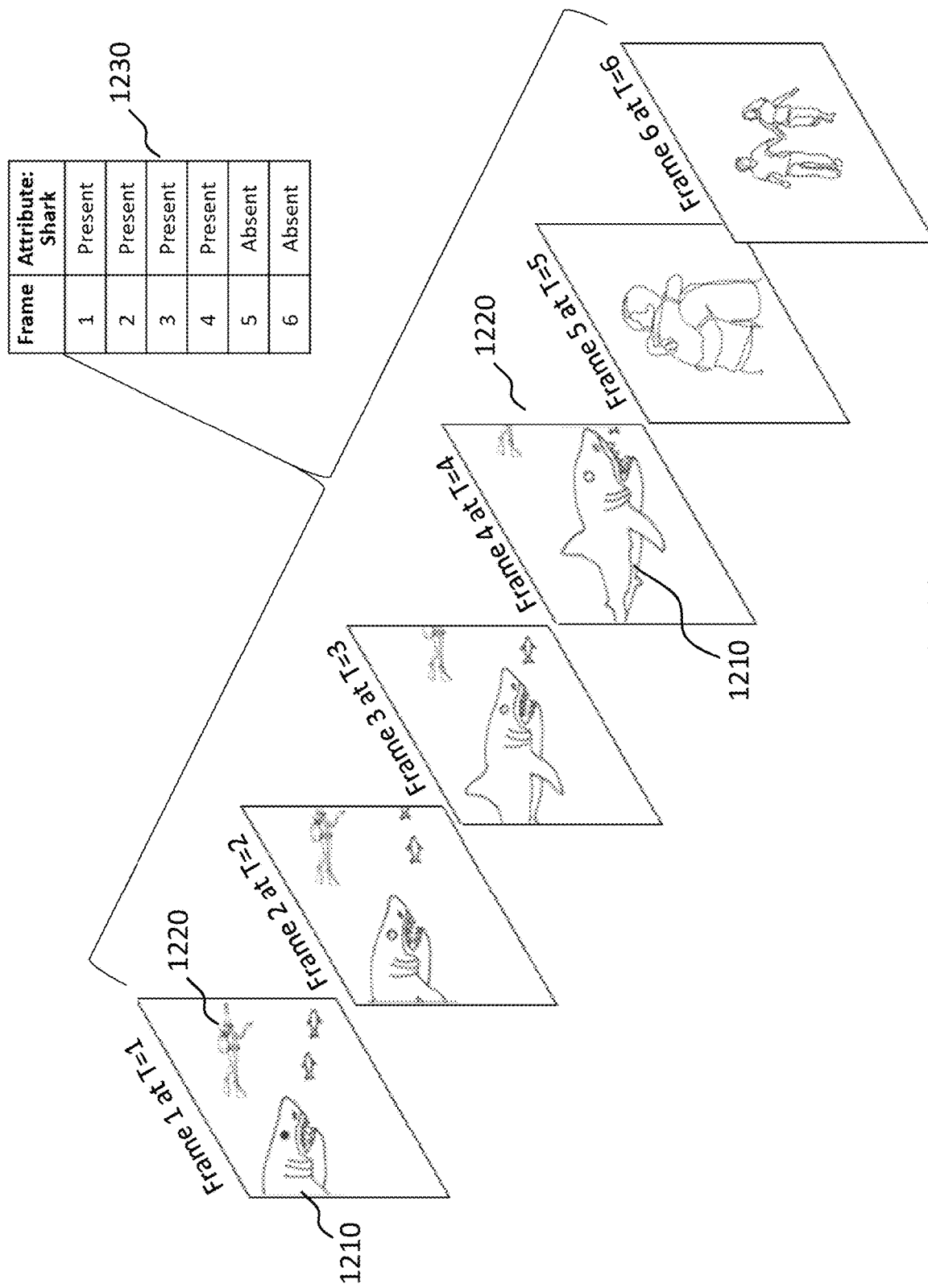
FIG. 12 is an example of a frame-by-frame analysis and an attribute table associated with the frames, in accordance with some embodiments.

Other fast forward action performed, as depicted in FIG. 8B, include automatically skip to the next portion 820 and rewriting, editing, and updating the manifest file 830. FIGS. 10-12 describes the action relating to automatically skipping/fast forwarding to the next portion 820 and FIG. 13 describes the action relating to editing and updating the manifest file 830.

FIG. 10 is flowchart of a process for collecting fast forward data and using it to make fast forwarding predictions and recommendations, in accordance with some embodiments. Since a previously fast forwarded portion is indicative of content that may not be of interest to the user, the process provides recommendations for upcoming portions that contain similar content as previously fast forwarded such that a user may not have to view content that is not of interest to them.

At block 1005 a fast forward command is detected. As depicted in FIG. 8A, in some embodiments, the fast forward command may be received based on user input, such as pressing a button on a remote control device or selecting a fast forward option on a touch screen. In other embodiments, instead of receiving a fast forward command from the user, the system may automatically detect, as depicted in FIG. 8A, the next upcoming portion of the media asset and evaluate the upcoming portion to determine if it contains an attribute that is not of interest to the user.

With respect to the user inputting/executing the fast forward command, the user may find the upcoming portion not of interest and decide to fast forward the portion such that they can skip it and move to the next portion of the media asset. For example, if the user does not like horror scenes or bloody scenes, and the upcoming scene includes such scenes, then the user may fast forward to the next portion of the media asset that does not contain such scenes.

Regardless of the reason for fast forwarding, once a fast forward is detected, the system, at block 1010 obtains metadata of the portion of the media asset that is associated with the fast forwarding. The portion for which the metadata is obtained is from the current play position to the fast forwarded position. For example, if the current play position is at 10 minutes and a 5 minute portion of the media asset was fast forward, then the metadata from time marker 10 minutes to 15 minutes would be obtained.

In some embodiments, metadata relating to the fast forwarded portion of the media asset may not be available. In other embodiment, the metadata may be available, however it may be limited or too general and may not be thorough enough to accurately represent the specific portion of the media asset that is to be fast forwarded. In such scenarios, various analyses, such as audio, image/video, textual analysis using NLP, AI, and machine learning algorithms may be executed to generate the needed metadata that represents the upcoming portion.

At block 1015, the system determines the presence and absence of data objects from the metadata relating to the fast forwarded portion and populates an attribute table. As mentioned earlier, the metadata may be available as part of the media asset through the platform at which the media asset is offered for consumption, or through audio, video/image analysis, or textual analysis to generate needed metadata when it is not available. The system may then generate an attribute table to identify the data objects that are present and absent from the portion to be fast forwarded.

At block 1020, the count for each attribute is incremented based on the number of times the attribute appears in any fast forward performed by the user. For example, a user may have previously fast forwarded a portion in the same media asset that has the same attribute, or the user may have fast forwarded a portion of another media asset that includes the same attribute, and as such, that count will be incremented for every occurrence of the attribute whether it is in the same media asset or a separate media asset.

At block 1025, a determination is made whether the attribute listed in the attribute table meets a threshold value.

As mentioned earlier, the threshold ensures that the listing of the attribute is not an outlier and the user in fact dislikes or does not have interest in watching the attribute. Since the probability of the user not liking an attribute can only be increased based on confidence level; as the count increases for an attribute listed in the attribute table so does the confidence level that the user does not have an interest in watching a portion of the media asset that includes the disliked or the non-interested attribute. The threshold may be set as low as "1" and as high as desired by the user or the system. If the threshold is set at "1," then even one appearance of the attribute in the attribute table would be sufficient for the system to make a recommendation that the upcoming portion should be fast forwarded.

In response to the count meeting the threshold, in one embodiment, at block 1030, the system may either provide a recommendation to fast forward or in another embodiment, without seeking user approval, automatically fast forward to a play position in the media asset that does not contain the attribute that is not of interest to the user. In some embodiments, a trickplay mode is used for fast forwarding. The trickplay mode may be activated at any point during or at the beginning of the display of the media asset, and when activated, the trickplay mode executes the trickplay algorithm that allows the user to fast-forward portions of media content.

In another embodiment, in response to the count meeting the threshold, at block 1040, the system may rewrite, edit, and update a manifest file and store it in the database. Further details relating to editing and updating a manifest file and using the manifest file for making recommendations is described in FIG. 13.

Figure 14:
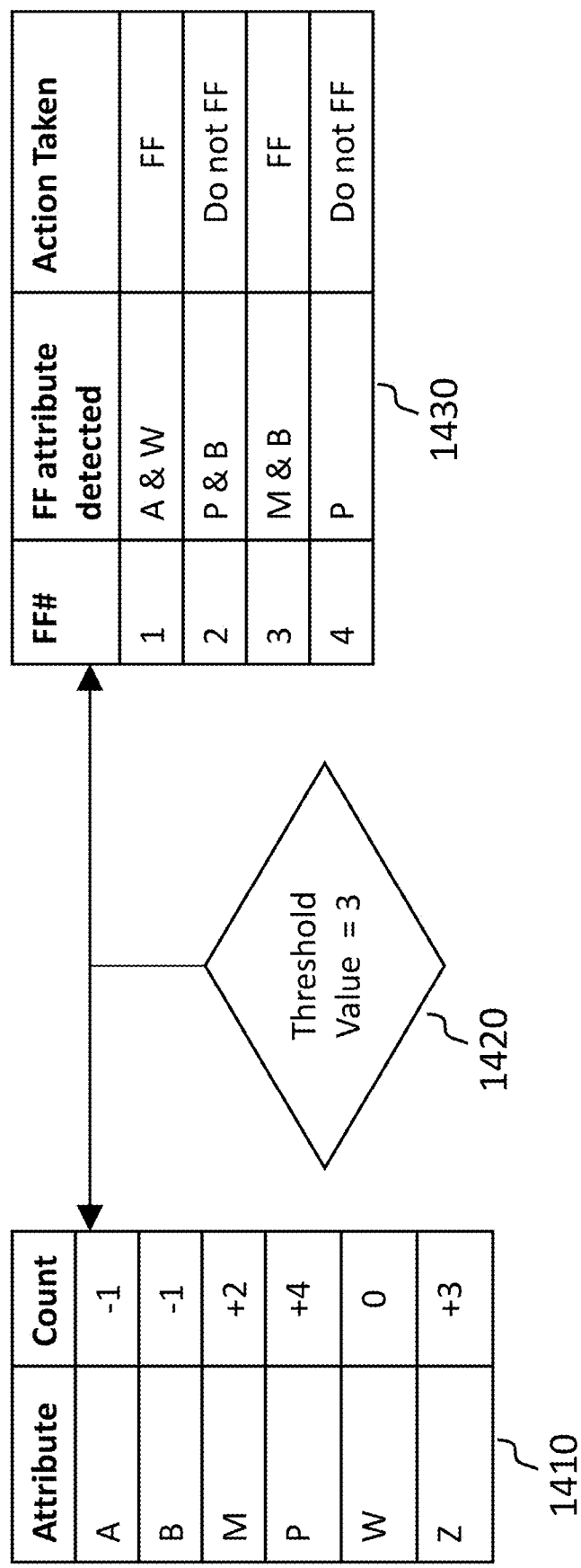
FIG. 14 is a block diagram of multiple attributes being evaluated together as a group, in accordance with some embodiments of the disclosure.

If a determination is made to fast forward the upcoming portion such as in block 1030, then the system determines the length of the fast forward such that the media asset may be fast forwarded to a frame that does not contain the attribute that is disliked or not of interest to the user. FIG. 14 determines the play position and length to which a fast forward should be executed such that it skips over the attribute not liked or not of interest to the user but at the same time does not skip over other portion or frames of the media asset since skipping over other portions beyond the frame that contains the disliked/disinterested attribute may result in the user missing out on essential plots of the media asset.

At block 1110, the system accesses attributes from the attribute table. The table may indicate which attribute is not of interest to the user. For example, if the user does not like scary or gory scenes, such as a shark attack or the suspense of a shark attack, then an attribute relating to presence of a shark may be listed and scored in the attribute table.

At block 1120 the system would analyze frame by frame whether the next frame contains the attribute that is listed in the attribute table. At block 130, if the attribute is still present in the next frame, then the system would analyze the frame following the next frame to determine if the attribute is still present in the next frame. As such the process of blocks 1120 and 1130 may be repeated until a determination is made at block 1130 that the next frame does not contain the attribute listed in the attribute table. Once such a determination is made, at block 1150 the system fast forwards the play position to a frame that is immediately following a previous frame that includes the attribute. As such, the frames that contain the attribute, which are disliked or not of interest to the user, are skipped and the very next frame which does not contain the attribute is not skipped and the play position is advanced to that very next frame.

The above process of fast forwarding to a frame that does not contain the attribute may be implemented in both situations when a fast forward command is executed by the user or when the system automatically detects that an upcoming segment contains an attribute that is in the attribute table and needs to be forwarded.

For example, when a user inputs a fast forward command, the system automatically determines, using the AI algorithm, that the upcoming portion includes an attribute that may be disliked by the user. If the attribute is not currently in the attribute table, then the system analyzes, based on AI, which attribute is likely not of interest to the user and therefore the reason for the user intending to fast forward the upcoming portion. For example, although the attribute in the upcoming portion is not in the attribute table, the system may make informed predictions based on other attributes disliked by the user to determine what likely attribute is not of interest to the user. Based on the prediction, the system may display, such as through a pop up display, a selectable option to the user to allow or reject the automatic fast forward. The system may also provide reasoning as to why the recommendation to fast forward is being made.

In other embodiments, when the system determines without user input, that an upcoming portion includes an attribute that is listed in the attribute table, then the system automatically performs the frame by frame analysis until it reaches a frame that does not include the attribute and forwards the media asset to the new play position that is immediately following the last frame that included the attribute from the attribute table.

One example of fast forwarding based on frame by frame analysis is provided in FIG. 12, in accordance with some embodiments of the disclosure. FIG. 12 represents a portion of the media asset for which a user may have initiated a fast forward command. It also represents a portion of the media asset that may have been automatically detected by the system based on the upcoming portion containing an attribute that is listed in the attribute table.

In this example, the user does not like to watch shark attacks, gory scenes, or the suspense and horror associated with a shark attack. The user's dislike, or lack of interest, may have been indicated in the user's profile or determined by the system based on the user's consumption history, such as by using machine learning and AI algorithms. In some embodiments, although the attribute table may specifically not list a shark or an attack, as mentioned earlier, the AI algorithm may make an informed prediction based on other scary or gory scenes disliked previously by the user that the shark attack may also be disliked by the user.

As depicted in FIG. 12, the scenes related to a shark and a scuba diver continue from frame 1 to frame 4, e.g., in frame 1, a shark 1210 is depicted chasing a scuba diver 1220 and the chase continues until frame 4 when the scuba diver 1220 escapes the shark chase. In frame 5, the scuba diver is shown hugging their friends in relief of escaping the shark attack. In frame 6, the scuba diver is shown walking away with their friend that leads to a different plot in the media asset.

Following the process of FIG. 11, the system analyzes frame by frame from frame 1 to frame 4 until it reaches a frame that does not include a shark, which is frame 5. The frame by frame analysis is shown in table 1230 where the system determines the presence and absence of the shark 1210. The system then automatically forwards the media asset to a play position of frame 5 such that the attribute, the shark, is no longer in the frame and any subsequent frames following the shark are not missed and accidentally fast forwarded.

Referring back to block 830 of FIG. 8B, the system may rewrite, edit, and/or update a manifest file such that it can be applied to a media asset for automatically fast forwarding, or provide the recommendation to fast forward, portions of the media asset displayed or portions of the media asset placed in a playlist to be watched at a later time.

Figure 13:
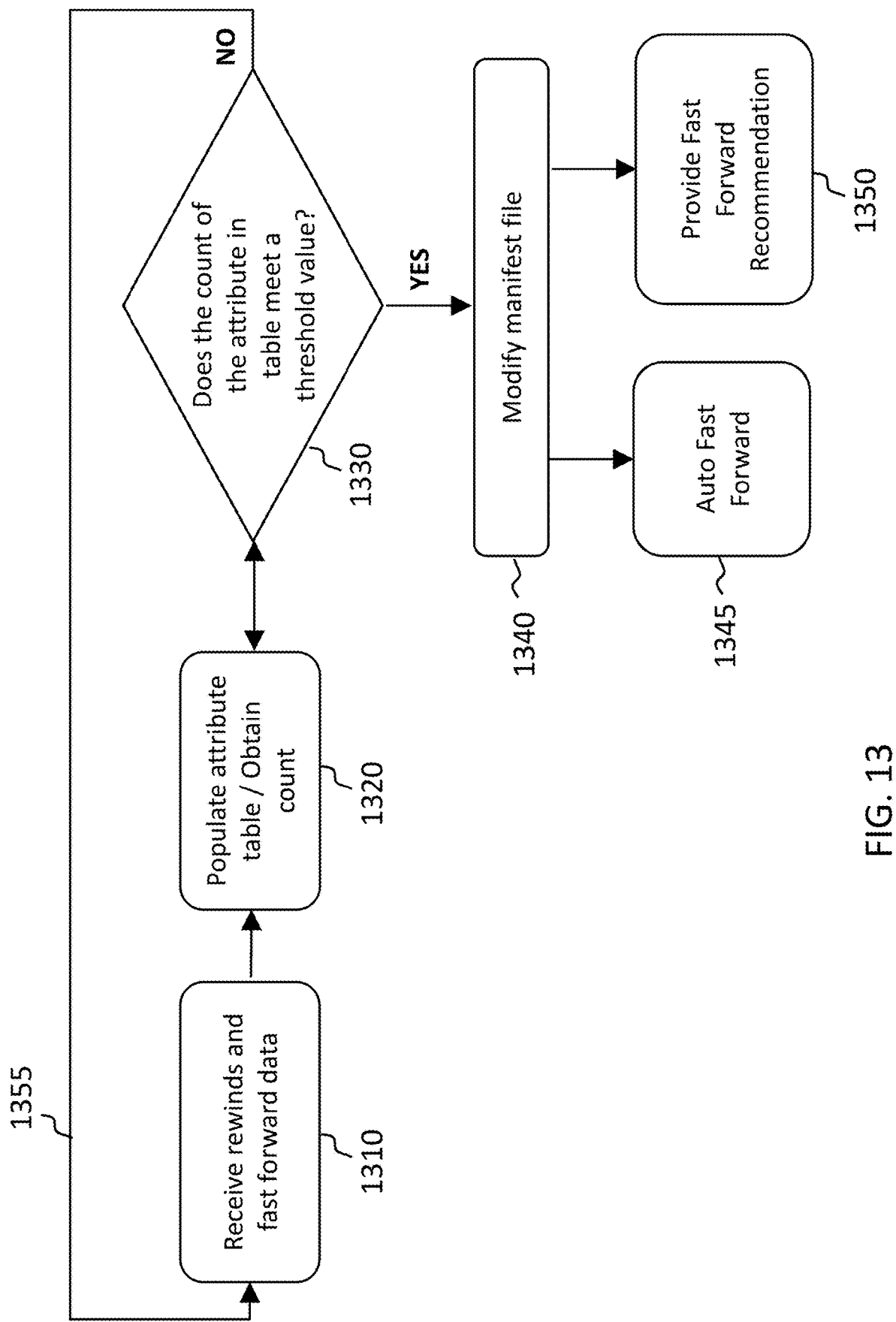
FIG. 13 is flowchart of a process for using a manifest file for making fast forwarding decisions and recommendations, in accordance with some embodiments of the disclosure.

FIG. 13 is flowchart of a process for using a manifest file for making fast forwarding decisions and recommendations, in accordance with some embodiments of the disclosure. The manifest file may be edited and rewritten before, during, or after the media asset is viewed. It may also be rewritten when a media asset is placed into a user playlist. In one embodiment rewriting the manifest file may also allow the system to determine fast forwarding decision before the media asset is consumed.

At block 1310 the system receives rewind and fast forward data based on rewinds and fast forwards performed on a plurality of media assets by the user. The rewind commands are received and processed as depicted in blocks 310-320 of FIG. 3 and the fast forwards commands are received and processed as depicted in blocks 1005-1010 of FIG. 10. The presence an absence of attributes found in portions of the media asset that are rewinded and fast forwarded are populated into the attribute table as described in FIGS. 3 and 10. Since the system captures rewind and fast forward data both in the current media asset displayed and any prior media asset consumed by the user, the count for the attribute in the attribute table is incremented based on the number of times the attribute is found either in a rewinded portion or a fast forwarded portion of the current or previously consumed media asset.

At block 1330 a determination is made whether the count of the attribute in the attribute table meets the threshold value. As described earlier, the threshold value is used as a measure of confidence and is indicative of the user's behavioral/consumption pattern, i.e. if the same action is performed 3 or 4 times, then the user faced with the same action would like perform the same action as they had done so previously.

Once that determination is made that the count does not meet the threshold value, then the system as depicted in 1355 continues to receive rewinds and forwards and monitor the attribute table until an attribute reaches the threshold value. However, if a determination is made at block 1330 that the count meets the threshold value, then at block 1340 the manifest file is rewritten.

As described earlier, the manifest files may be rewritten before, during, or after the media asset is viewed or when a media asset is placed into a playlist for future viewing. Rewriting the manifest file includes adding configurations to automatically fast forward portions of the media asset that include an attribute that matches the user consumption pattern, or the user's profile. For example, if the user typically fast forwards action scenes or gunfights, then the manifest file will be rewritten and implemented such that if a portion of the media asset being displayed includes an action scene or a gunfight, then the system would either display a recommendation for fast forwarding, as depicted in block 1350, or automatically fast forward, as depicted in block 1345, the portion of the media asset that contains the attribute related to the action scene are gunfight to a play position immediately following the action scene or gunfight attribute, e.g., such as forwarding to frame 5 in FIG. 12.

Likewise, if the user typically rewinds a portion of the media asset when an attribute is present, such as the presence of Tom Cruise, which is an indication that the user enjoys watching Tom Cruise, then, once the manifest file is rewritten, if a portion of the media asset contains scenes relating to Tom Cruise, then the system would display a recommendation not to fast forward and display a reason for the recommendation. The system may also prevent fast forwarding command until the user views the recommendation and decides to override the recommendation and fast forward the portion of the media asset.

FIGS. 13 and 14 depict examples of scoring of attributes in the attribute tables, in accordance with some embodiments of the disclosure. Although some references were made earlier to determine if an attribute was present or absent in a portion of the media asset, the references, for purposes of simplification, referred to a single attribute. However, the system is capable of analyzing multiple attributes at a time and making a determination based on consumption patterns even when multiple attributes are present, i.e. if a frame or frames of an upcoming portion contains multiple attributes that may be associated with different interests of the user, then the attributes will be evaluated both individually and as a group to make fast forwarding recommendations.

FIG. 14 describes some embodiments in which multiple attributes are evaluated individually and together as a group to make fast forwarding recommendations. In some embodiments, attribute table 1410 depicts a plurality of attributes A through Z that are either present or absent during a rewinded and consumed portion of one or more media assets. In this example, the attribute table includes attribute data based on a plurality of rewind operations performed over a course of time where multiple media assets were consumed by the user and during their consumption some portion in some of the media assets were rewinded and consumed. For every positive occurrence, i.e., presence, of an attribute in a rewinded portion of the media asset, a score of "+1" was associated with the attribute and likewise for every negative occurrence, i.e., absence, of an attribute in a rewind portion, a score of "−1" was associated with the attribute. For example, the attribute table indicates that attribute "M" was present twice in one or more previous rewinded portions and as such its score was incremented to "+2."

As depicted in table 1430, when multiple attributes are present in an upcoming portion, the decision whether or not to fast forward is determined based on an aggregated score of the attributes present in the upcoming portion. For example, if an upcoming portion in the media asset includes both attributes A & W, as depicted in row 1 of the table 1430, a score of −1+0=−1 is associated with the combination of the A & W attributes. Likewise, the combination of attribute P & B results in a score of +3 (+4−1=+3). As depicted in this example, the threshold value 1420 is predetermined to be "3." The threshold value can be any number determined by the user or the system and can be changed as desired. Based on the threshold value and the combined scores of attributes in the upcoming portion of the media asset, a fast forwarding recommendation may be made. For example, for the combination in row 1 (A&W) a recommendation to fast forward the upcoming portion may be made. In another example, for the combination in row 2 (P&B), a recommendation may be made to not fast forward the upcoming portion, i.e., not skip the upcoming portion and watch it instead.

Figure 15:
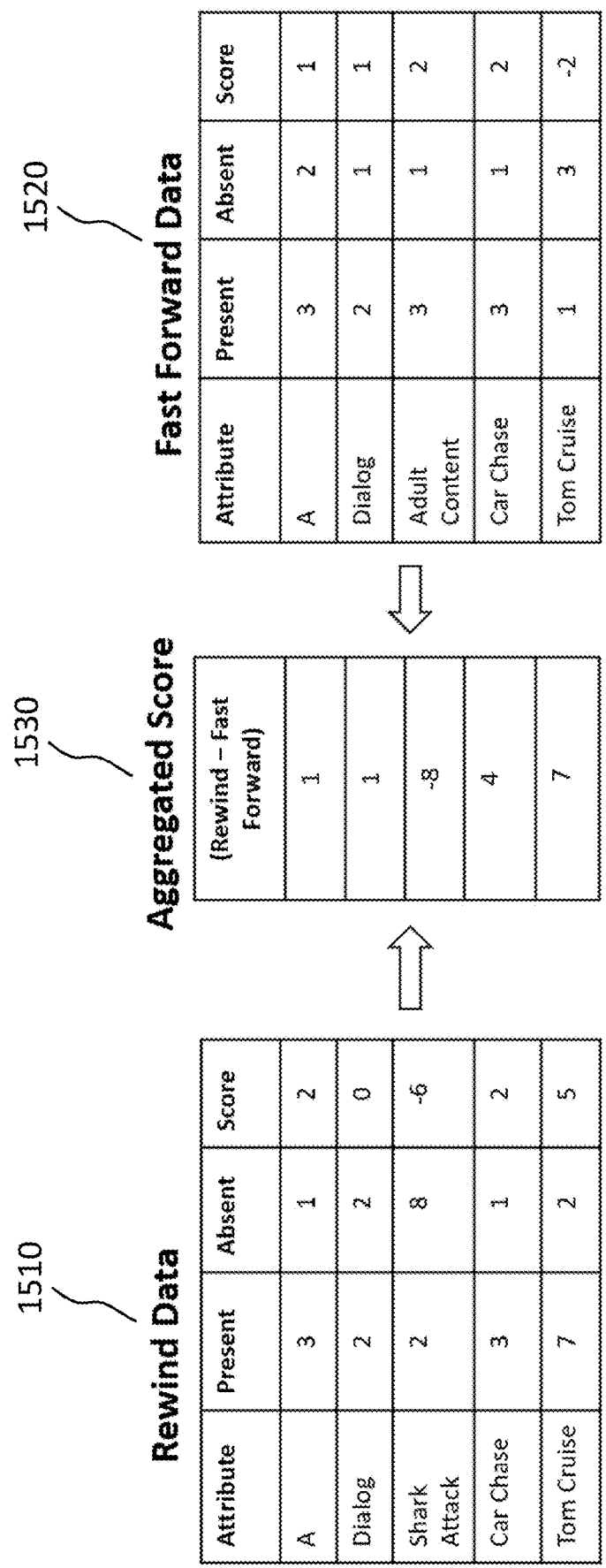
FIG. 15 is an attribute table and associated attribute score of rewind and fast forwarded portions of a media asset, in accordance with embodiments of the discussion.

FIG. 15 depicts an embodiment where both data from rewinded portions of the media asset and forwarded portions of the media asset are combined to determine an aggregated score, in accordance with embodiments of the discussion.

In some embodiments, the attributes either present or absent in one or more rewinded portions of the one or more media assets is provided in rewind data table 1510. Likewise, the attributes either present or absent in one or more fast forwarded portions of the one or more media assets is provided in fast forward data table 1520. The aggregated total score, which is fast forward score subtracted from the rewind score, is provided in aggregated score table 1530.

As described earlier, rewinding and rewatching a portion of the media asset is indicative of a desire, interest, and liking of the user towards one or more attributes and forwarding a portion of the media is indicative of the user's lack of desire, dislike, or lack of interest in the content. In some embodiments, the same attribute may be present in both a rewind and rewatched portion of the media asset as well as a fast forwarded portion of the media asset. Being present in both rewind and fast forward is an indication that the user likes to watch the attribute as some times and not watch the attribute at other times. In such situations, the system determines which is more likely to happen when faced with a situation where when an upcoming portion includes an attribute was the subject of both rewind and fast forward—is the user likely to rewind it or likely to fast forward it? To make a determination, the AI algorithm analyzes several factors such as time of day, day of week, working day versus a holiday, the user being home versus travelling, and other factors to determine if the user likes to watch the attribute at sometimes and not watch it at other times.

In another embodiment, to make a determination whether the upcoming content should be fast forwarded or watched, both rewind and fast forward data may be scored to compute an aggregated score that would be indicative of the likelihood of either the user faced with the attribute being present in an upcoming segment would either fast forward or watch the portion.

A machine learning algorithm may be used to determine a pattern based on both rewind and fast forward data. The pattern may be based on the aggregated score calculated. In one example, attribute "A" is present an absent in portion of the media said that were rewinded by the user. Attribute 'A" is also present and absent in a plurality of fast forward operations performed by the user. Computing an aggregated score of attribute "A" results in a score of "0." The calculation used is as follows:

Rewind Data(Present−Absent)−Fast Forward Data (Present−Absent)=Aggregated Score

As such the rewind data score is "1" (3−2) and the fast forward score is 1 (3−2) and the aggregated score is 1 (2−1). Likewise, the aggregated score for attribute "shark attack," is Rewind Score (2−8=−6)−Fast forward Score (3−1=2)="−8." A higher aggregated score, whether its positive or negative, provides a higher confidence of a pattern than a lower score since it is representative of a high number of times that the user took the same action when faced with the attribute.

Depending on the threshold set by either the user or the system, the aggregated score that meets the threshold will result in a recommendation not to fast forward an upcoming segment if it includes the attribute and a negative score that meets the negative threshold will result in a recommendation to fast forward an upcoming segment if it includes the attribute.

For example, the threshold is set at "+3" for skipping fast forwarding and instead watching the upcoming portion and a "−3" for fast forwarding the portion of the media asset until the attribute is no longer in the frame. In some embodiments, applying the threshold to attribute "Shark attack" will result in a recommendation to fast forward the portion of the upcoming media asset since it may contain scenes of a shark attack. The system may also provide details of why such a recommendation was made by notifying the user that a shark attack was displayed in the upcoming portion. In other embodiments, the system may automatically fast forward to a frame without the shark attack without seeking user input. Applying the same threshold to attribute "Tom Cruise" which has an aggregated score of 7 would result in a recommendation not too fast forward the upcoming portion since it contains "Tom Cruise," an attribute that is of interest to the user.

FIGS. 16A-16D are block diagrams depicting the amount of time saved by fast forwarding certain portions of the media asset that include an attribute that is not of interest to the user, according to some embodiments of the disclosure.

Figure 16:
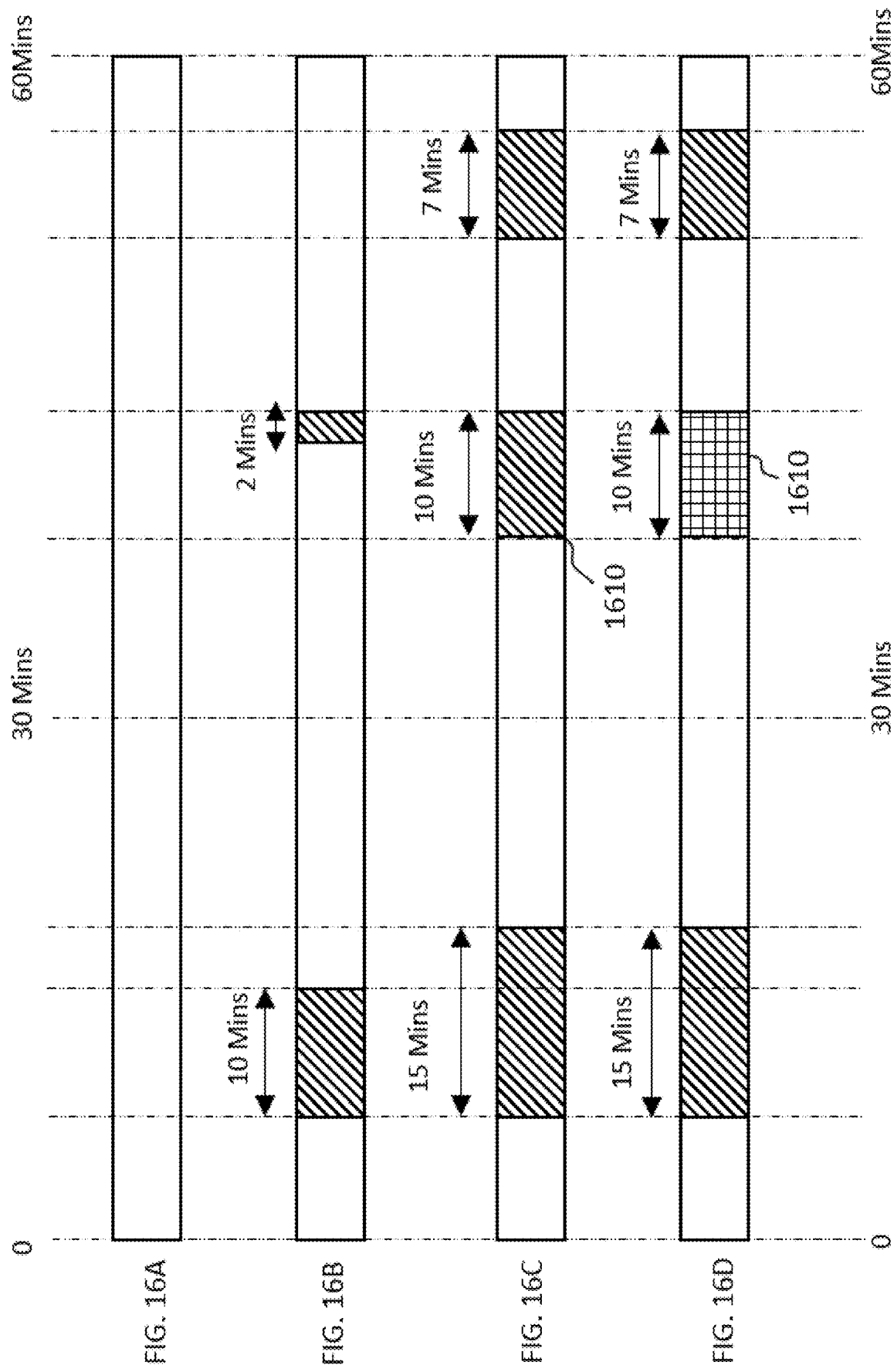
FIGS. 16A-16D are timelines of a media asset and graphical representations of portions that may be fast forwarded, in accordance with embodiments of the discussion.

As depicted in FIG. 16A, the media asset displayed has a total play time of 60 minutes. In one embodiment, as depicted in FIG. 16B, an attribute "car chase" is displayed twice in the media asset. It is displayed for a first time for 10 minutes and a second time for 2 minutes. The system may graphically depict the amount of time that will be saved if the portions that include the attribute car chase are fast forwarded/skipped, and the remaining portions of the media asset are watched.

In another embodiment, as depicted in FIG. 16C, attributes "car chase," "running scene (after the car case)," "dialog of John Doe," "Characters relaxing" and "baseball game" may be skipped by the user. These are attributes that occur in scenes within the same media asset that are depicted for the periods of time as shown by the hashed area. By skipping more portions of the media asset in FIG. 16C than in 16B, the user would save additional time and be able to watch the media asset in a shorter amount of time. The hashed portions may be recommendations provided by the system to fast forward since they contain an attribute that is likely not of interest to the user. As mentioned earlier, the system may determine that such an attribute is not of interest to the user based on the user's profile, consumption history, or a determination made by the AI algorithm.

FIG. 16D represents the same media asset as in FIGS. 16A-16C. In FIG. 16D, although a recommendation is made to fast forward the hash portion 1610 and FIG. 16C, the user may decide that they wish to override the recommendation and watch portion 1610 of the media asset that relates to a dialog with John Doe and a scene of characters relaxing. As such, the system may change the hashing to a different hashing pattern to indicate that the user has overwritten the recommendation and decided to watch portion 1610 of the media asset.

In some embodiments, the system allows colors, hashing, and other patterns to be used for graphically indicating the instances in a media asset in which an attribute is present or absent. The system may also provide in a different color or different hashing portions of the media asset that the user desires to consume. As such, hashing, colors, and other patterns may be used to graphically depict the amount of time that will be saved by skipping certain portions of the media asset.

In some embodiments, the system may provide an option to display a summary of the portions skipped such that the user may save time by fast forwarding and at the same time does not miss out on any key portions of the story in the media asset by reading the summary. The summary may be generated based on a closed caption file or by using speech translation, AI, or NLP algorithms.

Figure 17:
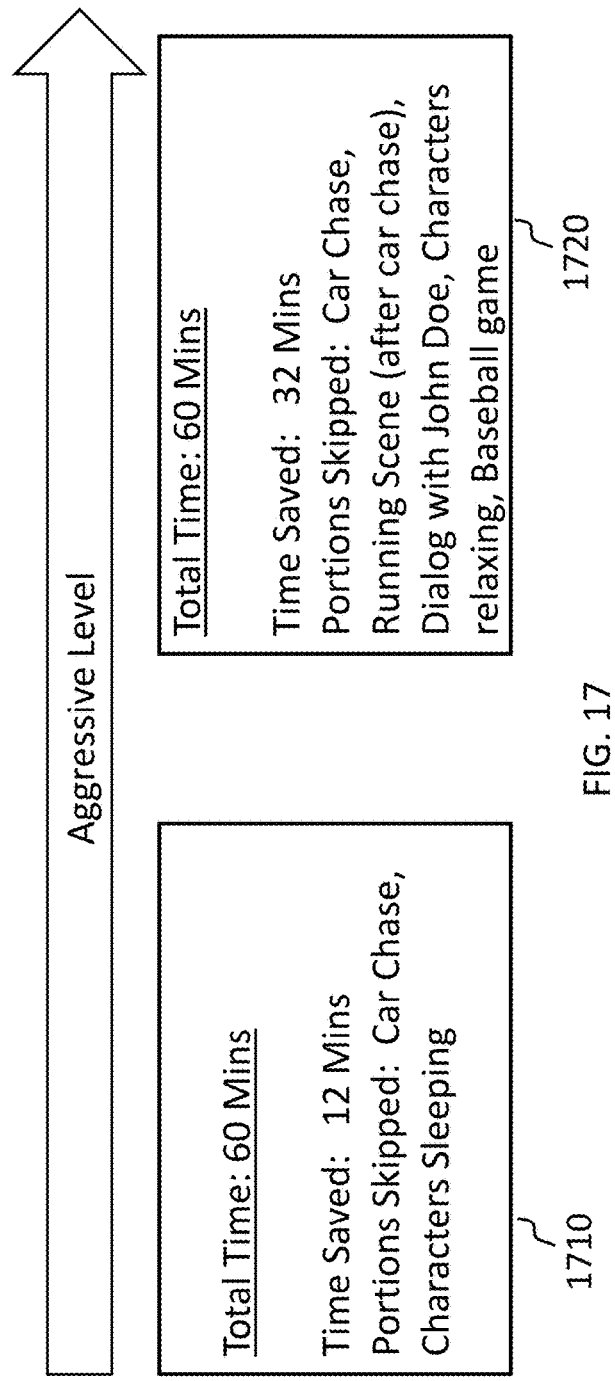
FIG. 17 is an information chart depicting the time saved by fast forwarding based on an aggrieve level selected, in accordance with embodiments of the discussion.
Figure 18:
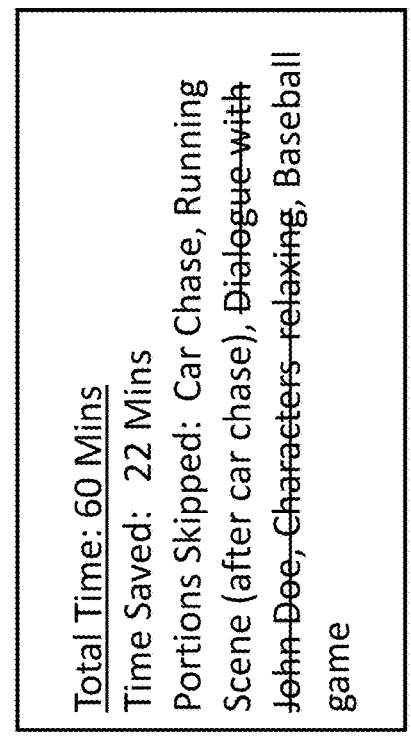
FIG. 18 is an information chart depicting the time saved by fast forwarding some portions of the media asset, in accordance with embodiments of the discussion.

FIGS. 17 and 18 depict various aggressive levels of fast forwarding that may be offered to a user for selection, according to some embodiments of the disclosure. FIG. 17 represents the attributes shown in FIGS. 16B and 16C. In one embodiment, upon hovering over, doing a mouse over, or selecting, the attributes displayed in FIGS. 16B and 16C, the system may provide information relating to the attributes and the amount of time saved by fast forwarding a portion that contains the attributes. The system may also provide various aggressive levels of fast forwarding for selection. For example, an option may be provided to select either aggressive level 1710 or 1720 in FIG. 17. Other variations of aggressive levels may also be provided. The various aggressive levels may be provided graphically, as depicted in FIG. 16A-16D, as well as textually, as depicted in FIG. 17. As depicted, if a selection of option 1710 is made, then the user may save 12 minutes in watching the 60 minutes media asset. If a more aggressive level, which is 1720, is selected, then the user may save 32 minutes of the 60 minute media asset. The system may allow the user to modify the recommendations and select which attributes the user desires to fast forward. As depicted in FIG. 18, in this example, the user decided to override, or modify, the recommendation to fast forward scenes relating to dialogue with John Doe and the characters relaxing. The overridden portion is depicted as a strikethrough text in the FIG. 18, however, other methods of displaying the overridden text are also contemplated. As such, system may calculate the amount of time saved and display it to the user, which in this example is 22 minutes saved.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A method comprising:
monitoring, using a machine learning module, execution of a plurality of rewind commands, wherein each rewind command is associated with rewinding a portion of a media asset and playing the portion from the rewinded play position;
in response to determining the execution of the plurality of rewind commands:
for each rewinded portion of the media asset, extracting metadata and identifying one or more attributes of the metadata;
using the machine learning module, identifying a consumption pattern based on a common attribute among the one of more identified attributes; and
in response to identifying the consumption pattern:
rewriting a manifest file for a selected media asset based on the identified common attribute, wherein the rewritten manifest file includes fast forwarding instructions to fast forward a portion of the selected media asset that includes the common attribute; and
transmitting the rewritten manifest file to a media device associated with a user that will be consuming the selected media asset.

2. The method of claim 1, further comprising:
associating the rewritten manifest file with the selected media asset; and
storing the manifest file in a database associated with the selected media asset.

3. The method of claim 1, wherein the fast forwarding instructions included in the manifest file identifies the length of fast forward to skip a portion of the media asset that contains the common attribute.

4. The method of claim 3, wherein the manifest file includes instructions to generate for display, a reasoning for fast forwarding the portion of the media asset that contains the common attribute.

5. The method of claim 1, further comprising transmitting the rewritten manifest file along with the media asset in a media stream to the media device.

6. The method of claim 1, wherein the manifest file is rewritten for a media asset that is placed in a playlist.

7. The method of claim 1, wherein the manifest file is rewritten for a media asset that is selected from an online platform.

8. The method of claim 1, further comprising:
receiving a fast forward command during the display of the selected media asset;
determining if a portion of the selected media asset to be fast forwarded includes the common attribute; and
in response to determining that a portion of the selected media asset includes the common attribute:
generating for display a recommendation relating to fast forward the portion of the media asset that includes the common attribute.

9. The method of claim 8, further comprising:
receiving a selection to fast forward the recommended portion of the media asset that includes the common attribute; and
fast forwarding the portion of the media asset until the fast forward reaches a frame of the media asset that does not contain the common attribute.

10. The method of claim 8, wherein, in response to determining that a portion of the selected media asset does not include the common attribute, generating for display a recommendation not to skip the portion of the media asset.

11. The method of claim 8, further comprising, automatically fast forwarding the portion of the media asset until the fast forward reaches a frame of the media asset that does not contain the common attribute, wherein the automatic fast forwarding is performed without user input.

12. A system comprising:
communication circuitry configured to access a media device; and
control circuitry configured to:
- monitor, using a machine learning module, execution of a plurality of rewind commands, wherein each rewind command is associated with rewinding a portion of a media asset and playing the portion from the rewinded play position;
- in response to determining execution of the plurality of commands:
  - for each rewinded portion of the media asset, extract metadata and identifying one or more attributes of the metadata;
  - using the machine learning module, identify a consumption pattern based on a common attribute among the one of more identified attributes; and
  - in response to identifying the consumption pattern:
    - rewrite a manifest file for a selected media asset based on the identified common attribute, wherein the rewritten manifest file includes fast forwarding instructions to fast forward a portion of the selected media asset that includes the common attribute; and
    - transmit the rewritten manifest file to a media device associated with a user that will be consuming the selected media asset.

13. The system of claim 12, further comprising, the control circuitry configured to:
- associate the rewritten manifest file with the selected media asset; and
- store the manifest file in a database associated with the selected media asset.

14. The system of claim 12, wherein the fast forwarding instructions included in the manifest file identifies the length of fast forward to skip a portion of the media asset that contains the common attribute.

15. The system of claim 14, wherein the manifest file includes instructions to generate for display, a reasoning for fast forwarding the portion of the media asset that contains the common attribute.

16. The system of claim 12, further comprising, the control circuitry configured to transmit the rewritten manifest file along with the media asset in a media stream to the media device.

17. The system of claim 12, further comprising, the control circuitry configured to:
- receive a fast forward command during the display of the selected media asset;
- determine if a portion of the selected media asset to be fast forwarded includes the common attribute; and
- in response to determining that a portion of the selected media asset includes the common attribute:
  - generate for display a recommendation relating to fast forward the portion of the media asset that includes the common attribute.

18. The system of claim 17, further comprising, the control circuitry configured to:
- receive a selection to fast forward the recommended portion of the media asset that includes the common attribute; and
- fast forward the portion of the media asset until the fast forward reaches a frame of the media asset that does not contain the common attribute.

19. The system of claim 17, wherein, in response to determining that a portion of the selected media asset does not include the common attribute, the control circuitry configured to generate for display a recommendation not to skip the portion of the media asset.

20. The system of claim 17, further comprising, the control circuitry configured to automatically fast forward the portion of the media asset until the fast forward reaches a frame of the media asset that does not contain the common attribute, wherein the automatic fast forwarding is performed without user input.

* * * * *